US012099636B2

(12) United States Patent
Bernat

(10) Patent No.: US 12,099,636 B2
(45) Date of Patent: Sep. 24, 2024

(54) METHODS, SYSTEMS, ARTICLES OF MANUFACTURE AND APPARATUS TO CERTIFY MULTI-TENANT STORAGE BLOCKS OR GROUPS OF BLOCKS

(71) Applicant: Intel Corporation, Santa Clara, CA (US)

(72) Inventor: Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 748 days.

(21) Appl. No.: 17/133,327

(22) Filed: Dec. 23, 2020

(65) Prior Publication Data

US 2021/0117555 A1    Apr. 22, 2021

(51) Int. Cl.
*G06F 21/64* (2013.01)
*G06F 9/54* (2006.01)
*G06F 21/60* (2013.01)
*H04L 9/14* (2006.01)
*H04L 9/30* (2006.01)
*H04L 9/32* (2006.01)

(52) U.S. Cl.
CPC .............. *G06F 21/64* (2013.01); *G06F 9/547* (2013.01); *G06F 21/602* (2013.01); *H04L 9/14* (2013.01); *H04L 9/30* (2013.01); *H04L 9/3242* (2013.01)

(58) Field of Classification Search
CPC ....................................................... G06F 21/64
See application file for complete search history.

(56) References Cited

U.S. PATENT DOCUMENTS

| 10,440,096 | B2 | 10/2019 | Sabella et al. |
| 2012/0110005 | A1* | 5/2012 | Kuo ..................... H04L 67/5682 707/769 |
| 2013/0151484 | A1* | 6/2013 | Kruglick ................ G06Q 30/04 707/692 |

(Continued)

FOREIGN PATENT DOCUMENTS

WO    2019231761    12/2019

OTHER PUBLICATIONS

European Patent Office, "Communication under Rule 71(3) EPC," issued Dec. 14, 2023, in connection with European Patent Application No. 21196372.3, 8 pages.

(Continued)

*Primary Examiner* — Bradley W Holder
(74) *Attorney, Agent, or Firm* — Hanley, Flight & Zimmerman, LLC

(57) ABSTRACT

An example apparatus includes a block manager to generate a map by mapping a group of storage blocks to a tenant using at least one of a tenant key identifier or an application key identifier, the group of storage blocks associated with a signature, the signature to validate the group of storage blocks, access a data access request for a first storage block, the data access request from a software stack, and perform a signature validation for the data access request based on the map of the group of storage blocks to the tenant. The example apparatus includes a migration handler to migrate data of the group of storage blocks and corresponding meta-data from a first storage device to a second storage device, the metadata including attestation data of the group of storage blocks.

25 Claims, 12 Drawing Sheets

(56) References Cited

U.S. PATENT DOCUMENTS

2013/0290256 A1* 10/2013 Barrall ................ G06F 16/27
                                                                707/634
2020/0136799 A1   4/2020 Smith et al.
2020/0186363 A1*  6/2020 Shockley ............. H04L 9/3263

OTHER PUBLICATIONS

Cisco, "Cisco Visual Networking Index: Global Mobile Data Traffic Forecast Update, 2014-2019," Feb. 3, 2015, retrieved from <https://community.cisco.com/kxiwq67737/attachments/kxiwq67737/4931-docs-wireless-mobility/2961/1/Cisco%20Visual%20Networking%20Index%20Global%20Mobile%20Data%20Traffic%20Forecast%20Update%202014-2019.pdf> on Dec. 28, 2023, 42 pages.

European Patent Office, "Extended European Search Report," issued in connection with European Application No. 21196372.3, Mar. 16, 2022, 8 pages.

Amazon Web Services, "Overview of Security Processes," dated Jun. 30, 2014, [Retrieved from the Internet: URL:https://media.amazonwebservices.com/pdf/AWS_Security_Whitepaper.pdf on Jan. 13, 2015], 68 pages.

Nicolae Paladi, "Trust but Verify—Trust Establishment Mechanisms in Infrastructure Clouds," Thesis, Department of Electrical and Information Technology, Lund University, dated Sep. 29, 2017, [retrieved from the Internet: URL:http://portal.research.lu.se/portal/files/30369903/nicolae_1th_thesis_FINAL.pdf on Jan. 17, 2019], 213 pages.

Hong et al., "Resource Management in Fog/Edge Computing: A Survey," Sep. 30, 2018, ACM Computing Surveys (CSUR), Retrieved from the Internet: <https://arxiv.org/abs/1810.00305> 22 pages.

Yousefpour et al., "All One Needs to Know about Fog Computing and Related Edge Computing Paradigms: A Complete Survey," Aug. 2018, Journal of Systems Architecture, 49 pages.

Lomet et al., "Multi-Version Concurrency via Timestamp Range Conflict Management," 2012, In Proceedings of the IEEE 28th International Conference on Data Engineering, Arlington, VA, USA, 12 pages.

Sangster et al., "Virtualized Trusted Platform Architecture Specification," Sep. 27, 2011, Trusted Computing Group, Incorporated (TCG), 60 pages.

* cited by examiner

METHODS, SYSTEMS, ARTICLES OF MANUFACTURE AND APPARATUS TO CERTIFY MULTI-TENANT STORAGE BLOCKS OR GROUPS OF BLOCKS

BACKGROUND

Edge computing is a distributed computing architecture that locates data computation and data storage closer to the location where it is needed. Edge computing improves response times and saves bandwidth by decreasing the distance between where the data computation and storage is completed (e.g., a base station, a network router, a hot spot, etc.) and where the data computation and storage is being requested (e.g., endpoint/user device). Edge cloud platforms can include a multi-tenant architecture that allows customers/users (e.g., tenants) to share computing resources in the cloud. Edge computing platforms include data certification and attestation for sharing data between different tenants and different edge devices.

BRIEF DESCRIPTION OF THE DRAWINGS

The figures are not to scale. In general, the same reference numbers will be used throughout the drawing(s) and accompanying written description to refer to the same or like parts.

Figure 1:
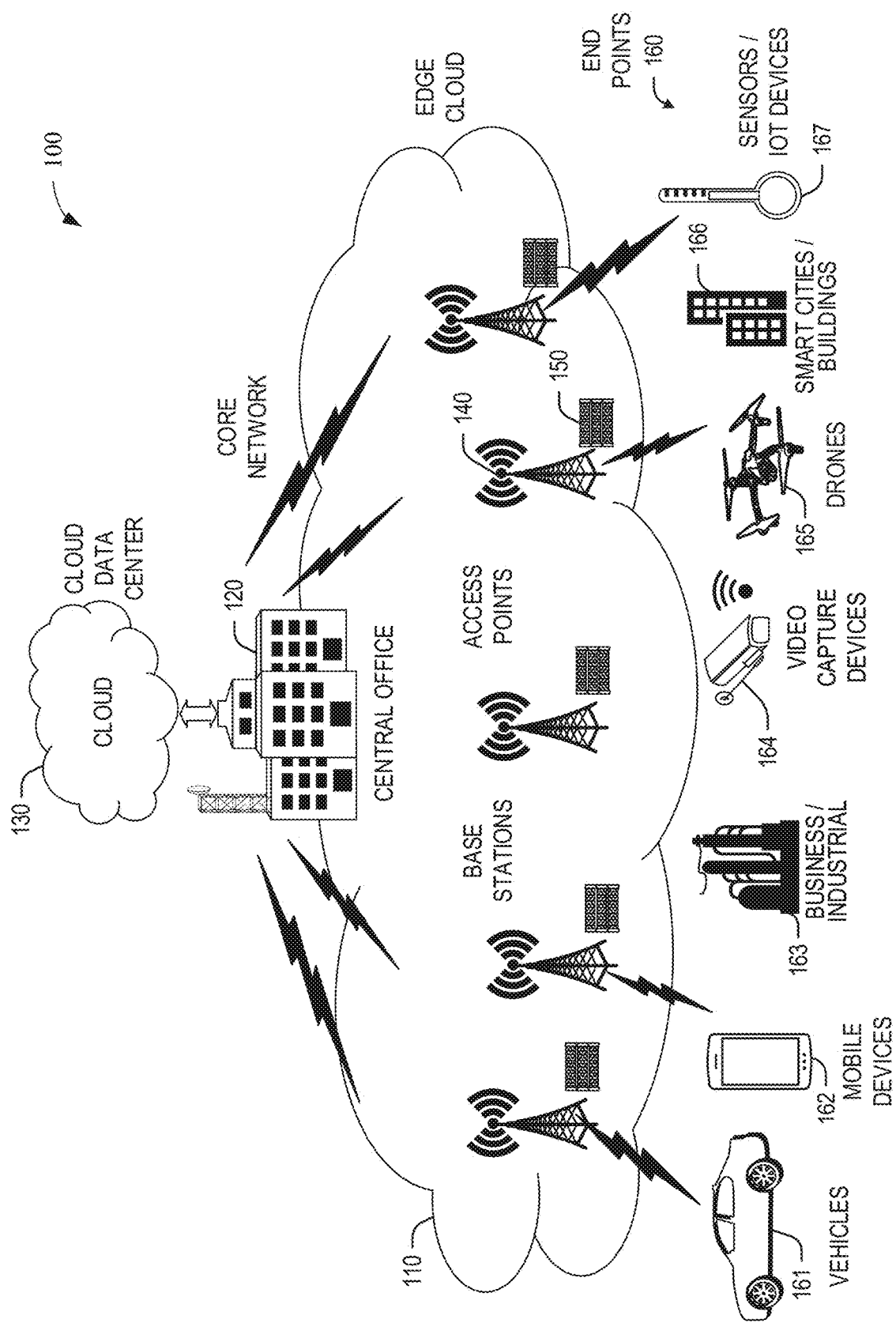
FIG. 1 illustrates an overview of an edge cloud configuration for edge computing.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time +/−1 second.

DETAILED DESCRIPTION

Although content delivery networks (CDN) and storage gateways are typically used for some cloud service providers (CSPs), edge cloud architectures can create accelerated and holistic hierarchical storage architecture to manage data and content per tenant. The edge cloud architecture typically provides storage at edge locations for caching content to better serve user requests. The edge cloud architecture improves user experience (by reducing latency and increasing throughput), improves reliability (by avoiding dependencies on the cloud), and reduces costs (by avoiding compute and traffic to the different network elements traversed until the cloud).

Edge cloud architectures are typically multi-tiered (e.g., base stations, core networks, data centers, and then the cloud/over-the-top (OTT) networks) and include automatic data caching solutions (e.g., different CommSP, CSPs, and users sharing the edge of the network). Additionally, edge cloud architectures provide a scalable storage architecture that dynamically provides more or less storage capacity and/or performance to a particular tenant, and provided physically secured content management and storage (e.g., preventing a base station from being spied on by a PCIe sniffer) along with secured content management and storage using data certification and attestation. In some examples, the edge cloud architecture includes hardware-based accelerated architecture (e.g., content pre-fetching, deep neural networks (DNN) to model data flows, etc.) to improve data traffic in the edge cloud.

In some examples, the edge computing architecture is a multi-tenant cloud that allows users (tenants) to share computing resources in the edge cloud. However, a challenge in the edge computing architecture (or any distributed multi-tenant architecture) is how tenants, devices, and/or services can validate that a particular piece of storage (e.g., one or multiple blocks of storage) has been generated by a particular service or entity. For example, as data is migrated across different edge locations, validating where the data was generated can be challenging in the multi-tenant edge computing architecture.

Previous solutions for validating pieces of storage are based on software solutions that sign files or other storage objects and store those signatures in the storage itself (e.g., the software stack is responsible to managing the data signature and validation). However, having the software stack perform the data hashing and signatures may cause a large overhead depending on the level of granularity for the data. For example, the storage stack performing the data hashing and signatures can substantially increase total cost of ownership (TCO) for a high level of granularity. Similarly, the software stack additionally performing the data validation of the data not only increases TCO, but also increases the complexity of the software design. Finally, the software stack migrating data and meta-data associated with each group of files of storage objects across multiple edge locations can further increase TCO and increase latencies in the edge cloud architecture. However, in edge storage gateways, the increases in TCO and latencies caused by the software stack performing data signatures, validation, and migration are not acceptable for real-time solutions.

Examples disclosed herein extend the current storage architecture (e.g., the storage devices) in the edge cloud architecture to include logic that allows mapping service private keys to groups of storage blocks, performing automatic or service generated block certification, and providing means for other software entities to read and validate a group of storage blocks using signature validation. Examples disclosed herein extend the storage devices in the edge cloud architecture instead of relying on the software stack, as seen in the previous solutions.

Examples disclosed herein extend the current storage architecture to provide a hardware accelerator to certify content/data in a multi-tenant system at block or multi-block granularity. In addition, examples disclosed herein include hardware circuitry to migrate storage blocks of data between different systems along the meta-data associated with the storage blocks. In examples disclosed herein, the hardware circuitry provides storage block certification for services and/or tenants that have generated data using corresponding signatures for the services and/or tenants.

Examples disclosed herein securely register and store private and public keys associated with a particular service (owned by a particular tenant). Examples disclosed herein manage mapping a list of groups of storage blocks (e.g., each group can include 1 to N number of storage blocks) to a particular tenant. In examples disclosed herein, each group of storage blocks include the last signature for all the blocks within that group. Examples disclosed herein can validate the signature (e.g., a sign hash using private key) automatically or per service request. Examples disclosed herein provide an interface to the other applications to allow the other application to ask the storage device to validate the signature on read request for storage block(s). Examples disclosed herein also migrate data between edge locations in the edge cloud architecture using the hardware circuitry.

Examples disclosed herein may be used to implement faster and transparent block or multi-block data certification. Examples disclosed herein provide data certification for multiple storage blocks (e.g., multiple files) associated with the same tenant/service using one signature. Examples disclosed herein allow applications to rely on the hardware circuitry to sign and validate storage blocks for fine granularity without increasing latency in the edge cloud architecture. Example disclosed herein allow data attestation at distributed architecture (e.g., 5G deployments) transparently to the software stack. Example disclosed herein migrate storage blocks and corresponding certification meta-data automatically between the hardware circuitry and the software stack transparently despite software stack heterogeneity (e.g., a ceph is one edge location and a luster in a second edge location) or system heterogeneity (e.g., Ubuntu in one part of the system and a Windows server in a second part of the system). Examples disclosed herein maintain transparency for applications in the software stack by providing an interface for applications to interact with data while providing validation. Examples disclosed herein may also be used to migrate storage blocks and corresponding certification meta-data automatically by discovering the data attestation data provided by the transparency between the hardware circuitry and the software stack.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
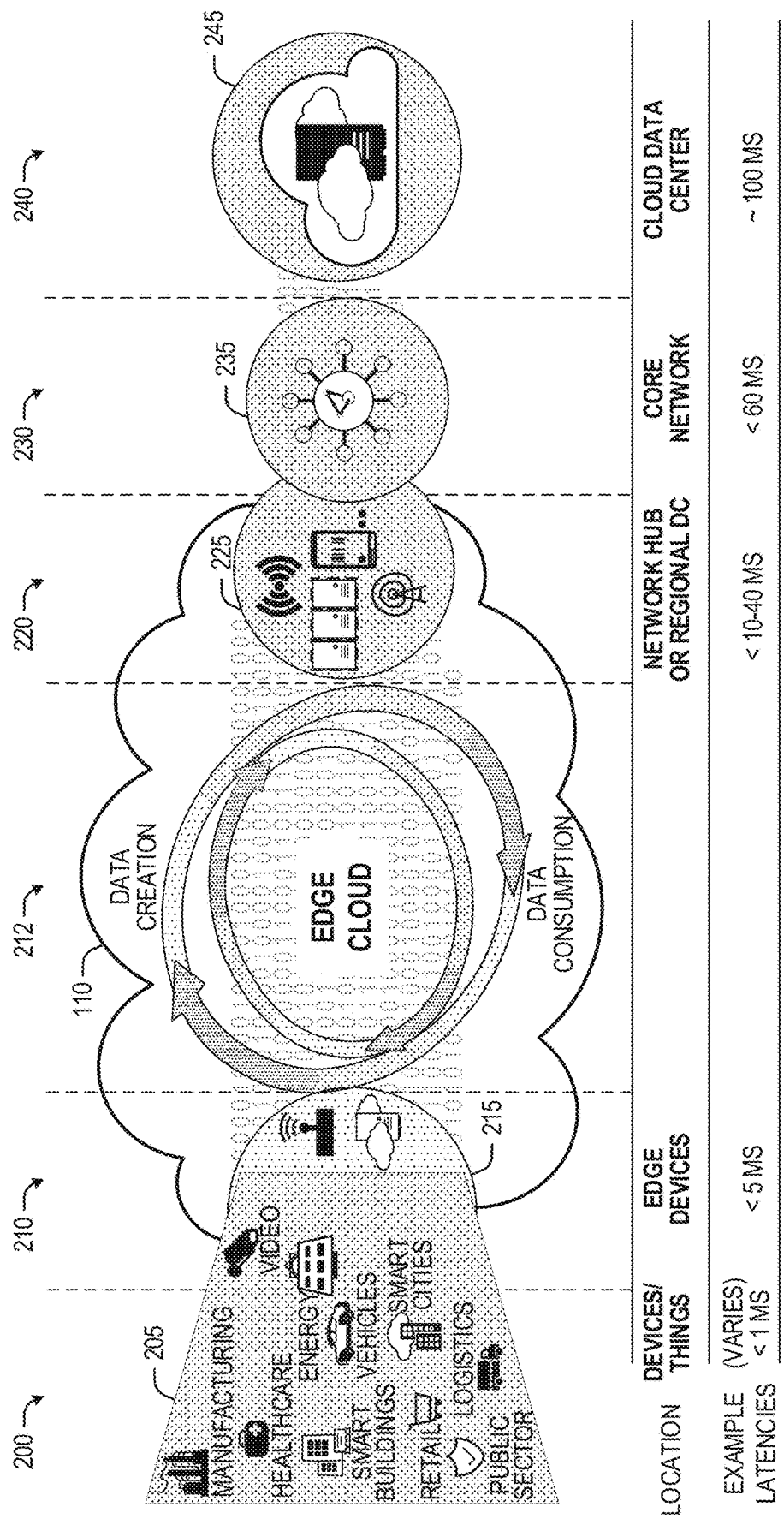
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, whereas some other input streams may tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multiowner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. The edge cloud 110 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
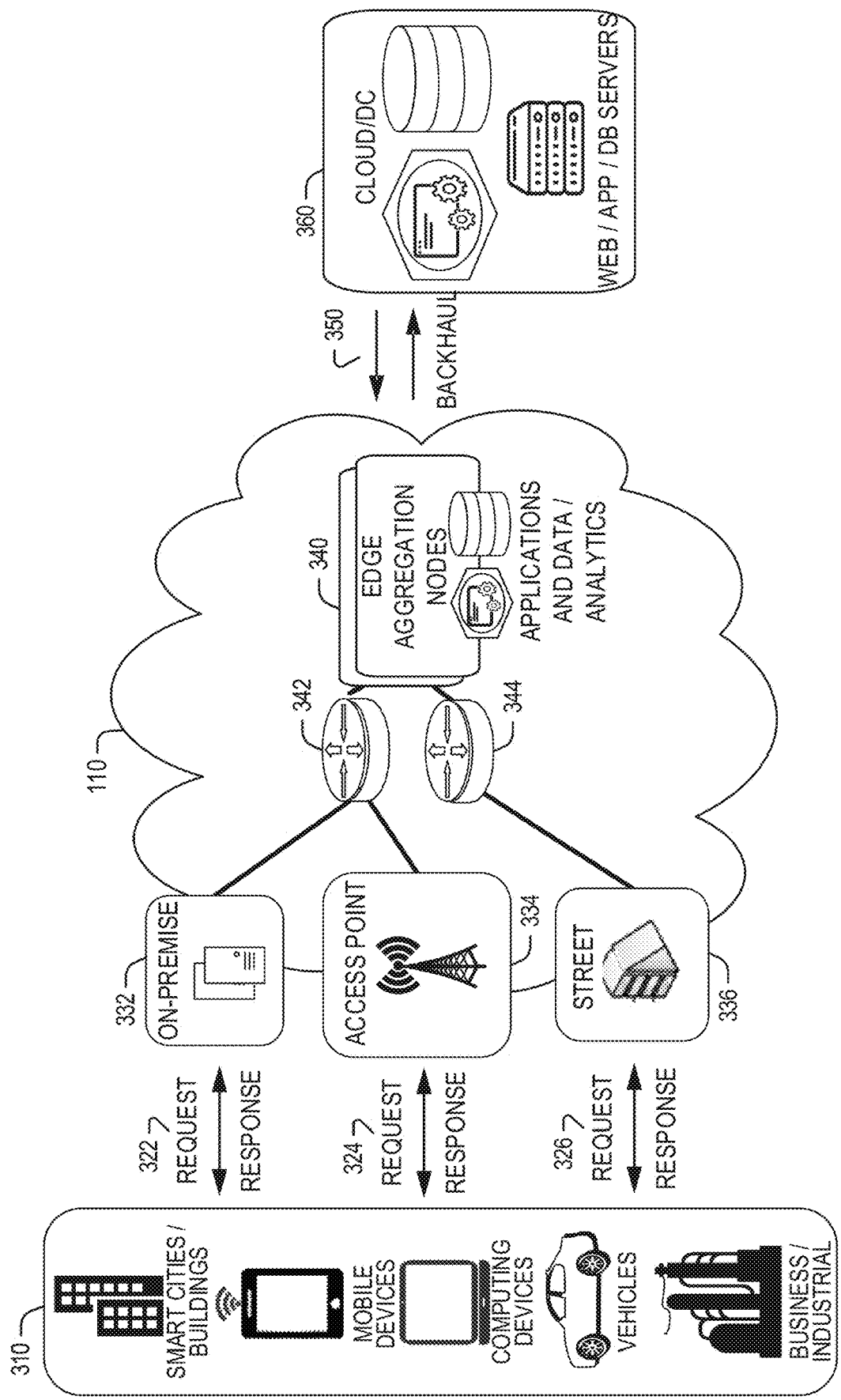
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
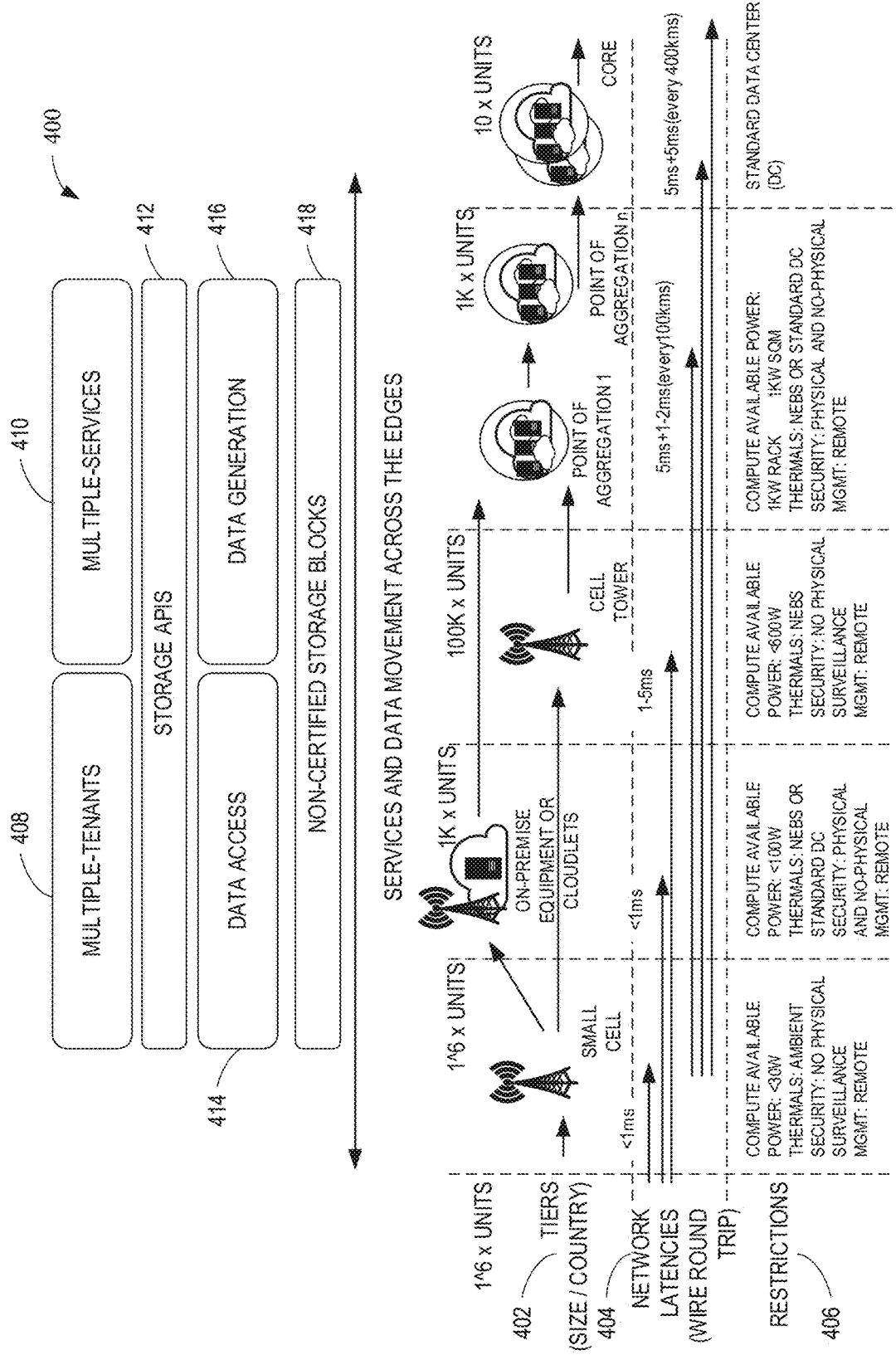
FIG. 4 illustrates an example prior edge computing architecture.

FIG. 4 illustrates an example prior edge computing architecture 400. The prior edge computing architecture 400 includes tiers 402, network latencies 404, restrictions 406, a multiple-tenant platform 408, a multiple-services platform 410, storage application programming interfaces (APIs) 412, data access functions 414, data generation functions 416, and non-certified storage blocks 418.

The multiple tiers 402 of the prior edge computing architecture 400 of FIG. 4 represent locations of edge devices and endpoint devices in the prior edge computing architecture 400. For example, the tiers 402 may identify distances of devices (e.g., base stations, gateways, network routers, endpoint (user) devices, or other devices) from the edge location. The network latencies 404 represent resulting latencies from network communication distance and processing time constraints between devices. In some examples, network latencies are typically in the range of milliseconds across the tiers 402. The restrictions 406 represent restrictions that some network operators or service providers may have in the prior edge computing architecture 400. For example, the restrictions 406 can be based on the edge location configurations, the type of compute, memory, storage, fabric, acceleration, tiers of locations, security, etc.

The prior edge computing architecture 400 illustrates the movement of services and data across the multiple-tenant platform 408, the multiple-services platform 410, the storage APIs 412, the data access functions 414, the data generation functions 416, and the non-certified storage blocks 418. In some examples, the storage APIs 412 provide the tenants included in the multiple-tenant platform 408 and the services included in the multiple-services platform 410 with access to the non-certified storage blocks 418. The data access functions 414 are used by the tenants of the multiple-tenant platform 408 to access data in the tiers 402. The data generation functions 416 are used by services in the multiple-services platform 410 to generate data in the tiers 402. In some examples, the storage APIs 412 and the non-certified storage blocks 418 are available across the multiple-tenant platform 408, the multiple-services platform 410, the data access functions 414, and the data generation functions 416.

Although the non-certified storage blocks 418 are available to the tiers 402 in the prior edge computing architecture 400, the prior edge computing architecture 400 does not provide capabilities to validate storage blocks across the tiers 402. In some examples, tenants in the prior edge computing architecture 400 access the non-certified storage blocks 418 by using the storage APIs 412. However, the tenants that access the non-certified storage blocks 418 in the prior edge computing architecture 400 cannot certify/validate if the source of the non-certified storage blocks 418 is trusted. Some examples may include software solutions that sign the non-certified storage block 418 and store those signatures in the storage itself (e.g., the software stack is responsible to managing the data signature and validation). However, the software stack performing the data hashing and signatures may cause a large overhead depending on the level of granularity for the data. Similarly, using the software stack to additionally perform the data validation of the data not only increases TCO, but also increases the network latencies 404 between the tiers 402.

Figure 5:
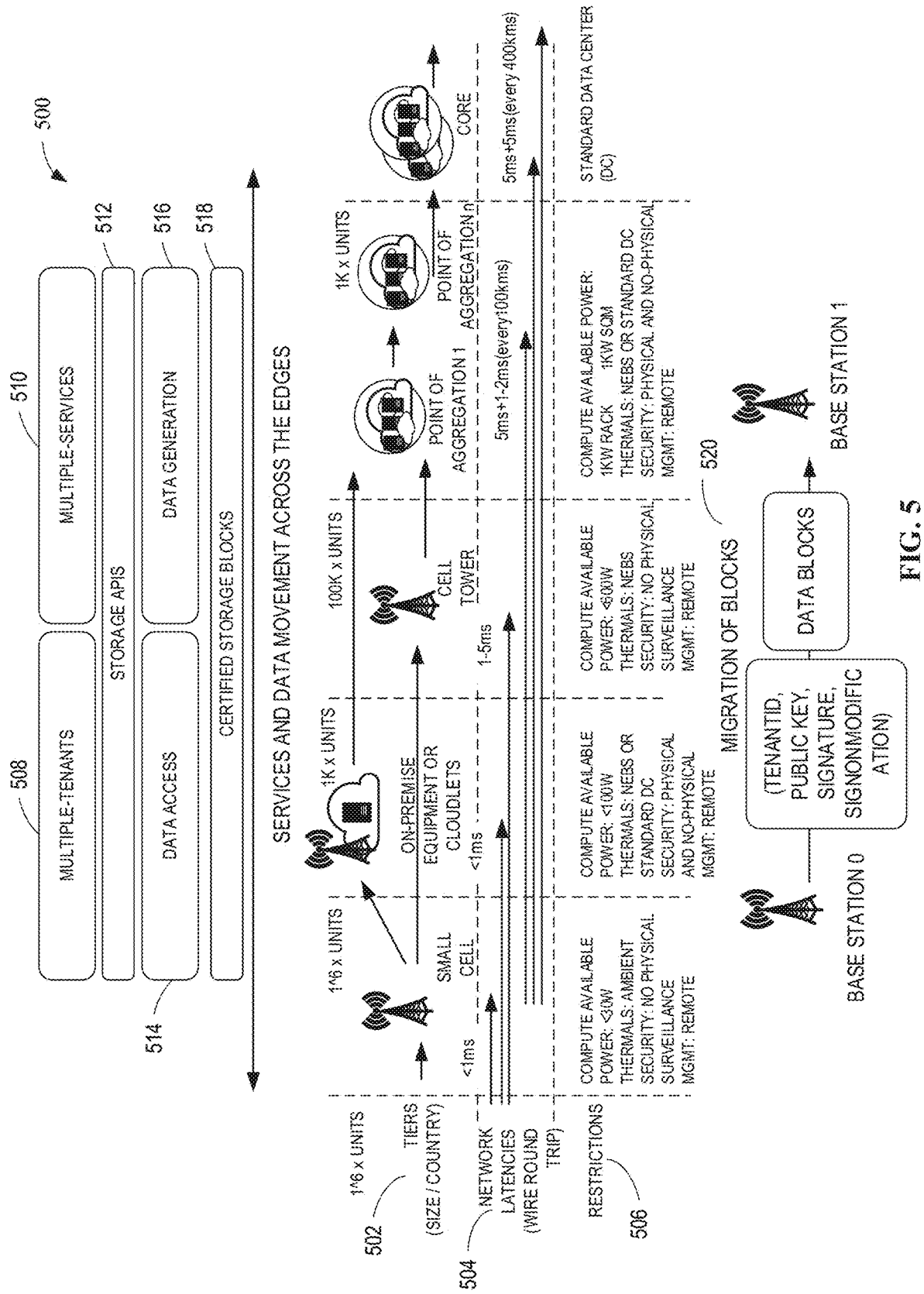
FIG. 5 illustrates an example edge computing architecture implemented in accordance with the teachings of this disclosure.

FIG. 5 illustrates an example edge computing network 500 implemented in accordance with teachings of this disclosure. The edge computing network 500 includes example tiers 502, example network latencies 504, example restrictions 506, an example multiple-tenant platform 508, an example multiple-services platform 510, example storage APIs 512, example data access functions 514, example data generation functions 516, example certified storage blocks 518, and example migration functions 520.

The example multiple tiers 502 include locations of edge devices and endpoint devices in the edge computing network 500. For example, the tiers 502 may identify distances of devices (e.g., base stations, gateways, network routers, endpoint (user) devices, or other devices) from an edge location. The example network latencies 504 represent latencies from network communication distance and processing time constraints between devices. In some examples, network latencies 504 are typically in the range of milliseconds across the tiers 502. The example restrictions 506 represent restrictions that some network operators or service providers may have in the edge computing network 500. For example, the restrictions 506 can be based on the edge location configurations, the type of compute, memory, storage, fabric, acceleration, tiers of locations, security, etc.

The example edge computing network 500 supports the movement of services and data across the multiple-tenant platform 508, the multiple-services platform 510, the storage APIs 512, the data access functions 514, the data generation functions 516, and the certified storage blocks 518. In some examples, the storage APIs 512 may be used by the tenants of the multiple-tenant platform 508 and the services of the multiple-services platform 510 to access the certified storage blocks 518. In the illustrated example, the data access functions 514 are used by the multiple-tenant platform 508 to access data in the tiers 502. In the illustrated example, the data generation functions 516 are used by the multiple-services platform 510 to generate data in the tiers 502. In some examples, the storage APIs 512 and the certified storage blocks 518 are available across the multiple-tenant platform 508, the multiple-services platform 510, the data access functions 514, and the data generation functions 516. In some examples, the storage APIs 512 include a storage controller (e.g., the example storage controller 602 described in further detail below in connection with FIG. 6) to manage the certified storage blocks 518.

The example certified storage blocks 518 are accessible by the example tiers 502. The example the storage APIs 512 may be used to validate the certified storage blocks 518 across the tiers 502. The example migration functions 520 may be used to migrate the certified storage blocks 518 across edge devices. For example, the certified storage blocks 518 may be migrated from a first base station to a second base station. In some examples, a storage controller may execute the storage APIs 512 to implement the migration functions 520. In some examples, the certified storage blocks 518 include a hardware accelerator to certify data in storage blocks/groups of storage blocks in the multiple-tenant platform 508 and the multiple-services platform 510. In some examples, the migration functions 520 additionally or alternatively include a hardware accelerator to migrate storage blocks of data between different systems/devices along with the meta-data associated with the storage blocks.

Figure 6:
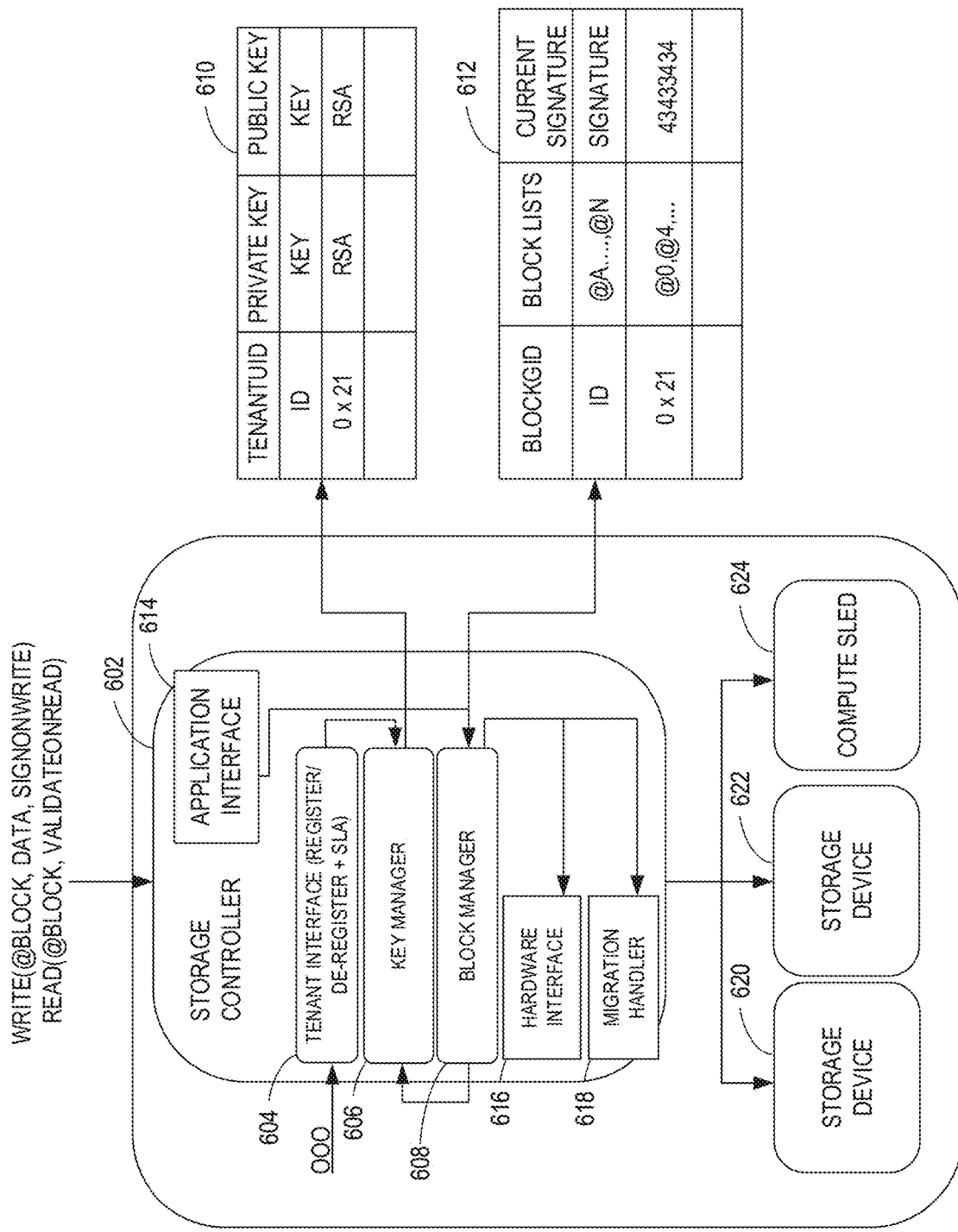
FIG. 6 is a block diagram of an example storage controller implemented in accordance with the teachings of this disclosure.

FIG. 6 is a block diagram of an example storage controller 602 implemented in accordance with teachings of this disclosure. The example storage controller 602 includes an example tenant interface 604, an example key manager 606, an example block manager 608, an example application interface 614, an example hardware interface 616, and an example migration handler 618. In the illustrated example, the storage controller 602 is in communication with an example key data store 610, an example block data store 612, example storage devices 620, 622, and an example compute sled 624.

The example tenant interface 604 provides tenant key identifiers of different tenants in the edge computing network 500 of FIG. 5 to the key manager 606. In some examples, the tenant interface 604 implements means for providing an identifier. In some examples, the tenant interface 604 provides application key identifiers of different applications of tenant(s) in the edge computing network 500 of FIG. 5 to the key manager 606. The example tenant interface 604 allows tenants in the edge computing network 500 to communicate with the storage controller 602 to manage tenant key identifiers and/or application key identifiers. The example tenant interface 604 receives tenant key identifiers and storage block addresses to associate with the tenant key identifiers of the tenants of the edge computing network 500. In some examples, the example tenant interface 604 receives application key identifiers and storage block addresses to associate with the application key identifiers of the applications corresponding to the tenants of the edge computing network 500. In some examples, the tenant interface 604 provides the tenant key identifiers and/or the application key identifiers along with the storage block addresses to the key manager 606 to register signatures for use by the different tenants to sign and validate data in the associated storage block addresses.

The example key manager 606 registers private keys and public keys associated with tenant key identifiers of the tenants in the edge computing network 500. In some examples, the key manager 606 implements means for registering private keys and public keys. The example key manager 606 signs and validates data in storage block addresses using the private keys and public keys. In some examples, the key manager 606 signs and validates data for a group of storage blocks associated with the same tenant using the private key and public key associated with the tenant key identifier of the tenant. In some examples, the key manager 606 receives a tenant key identifier from the tenant interface 604 and registers a public key and private key to be associated with the tenant key identifier. In some examples, multiple public keys and private keys are registered to a tenant key identifier. In some examples, the key manager 606 receives a tenant key identifier from the block manager 608, and the key manager 606 identifies a private key and a public key associated with the tenant key identifier to be used in validating the data in the storage block addresses of the group of storage blocks associated with the tenant key identifier. In some examples, the key manager 606 receives a tenant key identifier and storage block addresses from the tenant interface 604 to associate the registered private key and the registered public key, the tenant key identifier, and the storage block addresses. In some examples, one tenant may have multiple applications, and each application includes an application key identifier. In some examples, the key manager 606 receives an application key identifier and storage block addresses from the tenant interface 604 to associate the registered private key and the registered public key, the application key identifier, and storage block addresses. In some examples, the key manager 606 works with the block manager 608 to associate the registered private key, the registered public key, and the tenant key identifier with the storage block addresses from the tenant interface 604.

The example block manager 608 maps groups of storage blocks to tenants using tenant key identifiers and storage block addresses provided by the key manager 606. The example block manager 608 identifies groups of storage blocks by generating a block group identifier that is associated with the storage block addresses for the tenant. In the illustrated example, each storage block included in the group of storage blocks may include a different data file, and the block manager 608 groups the data files of the storage blocks into the group of storage blocks. The example block manager 608 associates the block group identifier and storage block addresses with the tenant key identifier and current signature provided by the key manager 606. In some examples, the block manager 608 associates the block group identifier and storage block addresses with an application key identifier and current signature provided by the key manager 606. The example block manager 608 receives data access requests from applications on the software stack using the example application interface 614. As used herein, a data access request can include a write request (e.g., a request to write data to a storage block) and/or a read request (e.g., a request to read data from a storage block). In some examples, the block manager 608 implements means for performing signature validation. The example block manager 608 performs signature validation for the data access requests based on the map of groups of storage blocks to tenants using tenant key identifiers and/or application key identifiers along with storage block addresses. In the illustrated example, the block manager 608 performs signature validation for a group of storage blocks using one signature associated with the block group identifier of the group of storage blocks. In examples disclosed herein, the block manager 608 validates a plurality of files associated with the storage blocks included in the group of storage blocks using the associated signature for the group.

In some examples, the block manager 608 receives the data access request and determines if the data access request is a write request or a read request. In some examples, the data access request includes a function call that identifies a write request or a read request (e.g., write( ) or read( )). For write requests, the block manager 608 receives a tenant key identifier and block address(es) in the write request. In some examples, the block manager 608 receives an application key identifier and block address(es) in the write request. The example block manager 608 identifies the private key and the public key that are associated with the tenant key identifier and/or the application key identifier provided in the write request using the key manager 606. In some examples, the write request includes a flag or bit (e.g., a signature update flag) that identifies if the signature for the storage blocks identified by the write request needs to be updated. The example block manager 608 determines whether the write request includes the signature update flag to indicate the signature associated with the write request is to be updated. In some examples, an application on the software stack may demand to specifically regenerate the hash of a group of storage blocks and the signature for the group of storage blocks. In such examples, the write request includes the signature update flag to indicate the application on the software stack wants to regenerate the hash of a group of storage blocks and the signature for the group of storage blocks. In examples where the write request does include the signature update flag for a signature update, the block manager 608 updates the private key associated with the tenant key identifier and/or the application key identifier included in the write request, and the block manager 608 provides the updated private key to the key manager 606.

The example block manager 608 identifies the block group identifier for the block address(es) provided in the write request using the map of block group identifiers to storage block addresses. The example block manager 608 identifies the storage block(s) associated with the identified block group identifier. In some examples, the block group identifier is associated with a group of storage blocks that include storage blocks and corresponding storage block addresses that were not included in the write request. The example block manager 608 generates a hash of the group of storage blocks identified as being associated with the block group identifier of the write request. The example block manager 608 signs the hash with the private key (either the original private key associated with the tenant key identifier and/or the application key identifier provided in the write request using the key manager 606, or the updated private key). In some examples, the block manager 608 signs the hash using hardware circuitry. In such examples, the block manager 608 accesses a hardware device (e.g., a field-programmable gate array (FPGA), an application-specific integrated circuit (ASIC), etc.) using the example hardware interface 616 to sign the hash, as described in further detail below.

For read requests, the example block manager 608 receives a tenant key identifier and block address(es) in the read request. In some examples, the block manager 608 receives an application key identifier and block address(es) in the read request. The example block manager 608 identifies the block group identifier for the block address(es) provided in the read request using the map of block group identifiers to storage block addresses. The example block manager 608 identifies the storage block(s) associated with the identified block group identifier. In some examples, the block group identifier is associated with a group of storage blocks that include storage blocks and corresponding storage block addresses that were not included in the read request. The example block manager 608 generates a hash of the group of storage blocks identified as being associated with the block group identifier of the read request.

In some examples, the read request includes a flag or bit (e.g., a certification flag) that identifies if the read request is to be certified/validated. The example block manager 608 determines whether the read request includes the certification flag to indicate the read request is to be certified/validated before providing results data from the hash of the group of storage blocks. In examples where the read request does include the certification flag for certification/validation, the block manager 608 identifies the private key and the public key that are associated with the tenant key identifier and/or the application key identifier provided in the read request using the key manager 606. The example block manager 608 validates the signature from the read request with the signature from the private key associated with the tenant key identifier and/or the application key identifier provided in the read request using the key manager 606. In some examples, the block manager 608 validates the signature from the read request using hardware circuitry. In such examples, the block manager 608 accesses a hardware device (e.g., an FPGA, an ASIC, etc.) using the example hardware interface 616 to validate the signature, as described in further detail below. In response to the example block manager 608 validating the signature from the read request, the block manager 608 provides the data from the hash of the group of storage blocks along with the result of the data attestation to the requesting application of the software stack.

The example key data store 610 stores the tenant key identifiers for tenants and the associated private keys and public keys from the key manager 606. In some examples, the key manager 606 stores the registered private keys and public keys along with the associated tenant key identifiers in the key data store 610. In some examples, the key manager 606 stores registered private key and public keys along with the associated application key identifiers from the key manager 606 in the key data store 610. In some examples, the block manager 608 notifies the key manager 606 when a signature associated with a tenant key identifier and/or an application key identifier needs to be updated. In such examples, the key manager 606 registers a new private key for the tenant key identifier and/or the application key identifier and stores the new private key in the key data store 610. In some examples, the key data store 610 may be implemented by Synchronous Dynamic Random Access Memory (SDRAM), Dynamic Random Access Memory (DRAM), RAMBUS® Dynamic Random Access Memory (RDRAM®), static random access memory (SRAM), flash memory, and/or any other type of memory device, memory cells, memory circuitry, etc.

The example block data store 612 stores block group identifiers that are identified by the block manager 608 along with the associated tenant key identifiers, storage block addresses, and the current signatures. In some examples, the block manager 608 identifies and stores block group identifiers in the block data store 612 with the associated tenant key identifiers, the storage block addresses, and the current signatures from the key manager 606. In some examples, the block manager 608 identifies and stores block group identifiers in the block data store 612 with associated application key identifiers, the storage block addresses, and the current signatures from the key manager 606. In some examples, the block manager 608 uses the block data store 612 to validate data access requests received by the application interface 614. In some examples, the block data store 612 may be implemented by Synchronous Dynamic Random Access Memory (SDRAM), Dynamic Random Access Memory (DRAM), RAMBUS® Dynamic Random Access Memory (RDRAM®), static random access memory (SRAM), flash memory, and/or any other type of memory device, memory cells, memory circuitry, etc.

The example application interface 614 receives data access requests from applications on the software stack. In some examples, the application interface 614 implements means for receiving a data access request. In some examples, the application interface 614 receives a data access request that identifies either a write request or a read request. In some examples, the data access request includes a function call that identifies a write request or a read request (e.g., write( ) or read( )). In some examples, the data access request includes storage block address(es) to identify the storage block address(es) the block manager 608 will read from to access data or write new data to. For example, the application interface 614 may receive "Write@Block, Data, SignOnWrite" for a write request, where "@Block" is a storage block address, "Data" is the data to write to the storage block, and "SignOnWrite" is the signature update flag that identifies if the signature for the storage blocks identified storage block address needs to be updated. Additionally, in some example, the application interface 614 may receive "Read@Block, ValidateOnRead)" for a read request, where "@Block" is a storage block address and "ValidateOnRead" is the certification flag that identifies if the read request is to be certified/validated. In some examples, the application interface 614 receives migration requests from applications on the software stack. In some examples, the migration request includes a block group identifier that identifies the group of storage blocks to be migrated. In some examples, the migration request identifies the storage device that is to receive the data of the group of storage blocks from the migration.

The example hardware interface 616 accesses hardware devices to perform the data signing and validation performed by the example block manager 608. In the illustrated example, the block manager 608 uses a hardware device (e.g., an FPGA, an ASIC, etc.) to hash storage blocks and signatures during the data signing and validation. In some examples, the hardware interface 616 provides the block manager 608 with access to the hardware circuitry to perform the data hashing and signature hashing. In the illustrated example, the hardware interface 616 allows the acceleration of hashing the storage block and signatures to provide a good response time by allowing the block manager 608 to access the hardware devices.

The example migration handler 618 migrates data of groups of storage blocks along with the corresponding meta-data that include the attestation data of the group of storage blocks from an example first storage device 620 to an example second storage device 622. In some examples, the migration handler 618 implements means for migrating data. In some examples, the migration handler 618 receives a migration request from the application interface 614. In some examples, the migration handler 618 receives a block group identifier in the migration request, and the migration handler 618 retrieves the storage blocks associated with the block group identifier from the block manager 608. In some examples, the migration handler 618 migrates the data of the group of storage blocks associated with the block group identifier, the certification information of the data of the group of storage blocks, and the public key corresponding to the group of storage blocks from the first storage device 620 to the second storage device 622. In some examples, the first storage device 620 and the second storage device 622 are at different edge locations in an edge computing network (e.g., the example edge computing network 500 of FIG. 5). For example, the first storage device 620 may be a first base station and the second storage device 622 may be a second base station in the edge computing network. In the illustrated example, the private key associated with the group of storage blocks is not migrated to the requesting storage device (e.g., the second storage device 622). However, in additional or alternative examples, the private key can be migrated by the migration handler 618 in response to a migration request.

In some examples, the migration handler 618 accesses hardware circuitry to migrate the data of the group of storage blocks associated with the block group identifier, the certification information of the data of the group of storage blocks, and the public key corresponding to the group of storage blocks. In such examples, the migration handler 618 access a hardware device (e.g., an FPGA, an ASIC, etc.) using the hardware interface 616 to increase the speed of the migration of data. In some examples, the migration handler 618 migrates data of groups of storage blocks along with the corresponding meta-data that includes the attestation data of the group of storage blocks between different storage systems. For example, the migration handler 618 can migrate the data of the group of storage blocks associated with the block group identifier, the certification information of the data of the group of storage blocks, and the public key corresponding to the group of storage blocks from the first storage device 620 to an example compute sled 624 and vice versa.

While an example manner of implementing the storage controller 602 is illustrated in FIG. 6, one or more of the elements, processes and/or devices illustrated in FIG. 4 may be combined, divided, re-arranged, omitted, eliminated and/or implemented in any other way. Further, the example tenant interface 604, the example key manager 606, the example block manager 608, the example application interface 614, the example hardware interface 616, the migration handler 618 and/or, more generally, the example storage controller 602 of FIG. 6 may be implemented by hardware, software, firmware and/or any combination of hardware, software and/or firmware. Thus, for example, any of the example tenant interface 604, the example key manager 606, the example block manager 608, the example application interface 614, the example hardware interface 616, the migration handler 618 and/or, more generally, the example storage controller 602 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example tenant interface 604, the example key manager 606, the example block manager 608, the example application interface 614, the example hardware interface 616, and/or the migration handler 618 is/are hereby expressly defined to include a non-transitory computer readable storage device or storage disk such as a memory, a digital versatile disk (DVD), a compact disk (CD), a Blu-ray disk, etc. including the software and/or firmware. Further still, the example storage controller 602 may include one or more elements, processes and/or devices in addition to, or instead of, those illustrated in FIG. 6, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the storage controller 602 are shown in FIGS. 7-10. The machine readable instructions may be one or more executable programs or portion(s) of an executable program for execution by a computer processor and/or processor circuitry, such as the processor 1112 shown in the example processor platform 1100 discussed below in connection with FIG. 11. The program(s) may be embodied in software stored on a non-transitory computer readable storage medium such as a CD-ROM, a floppy disk, a hard drive, a DVD, a Blu-ray disk, or a memory associated with the processor 1112, but the entire program(s) and/or parts thereof could alternatively be executed by a device other than the processor 1112 and/or embodied in firmware or dedicated hardware. Further, although the example program(s) is/are described with reference to the flowcharts illustrated in FIGS. 7-10, many other methods of implementing the example storage controller 602 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 7-10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 7:
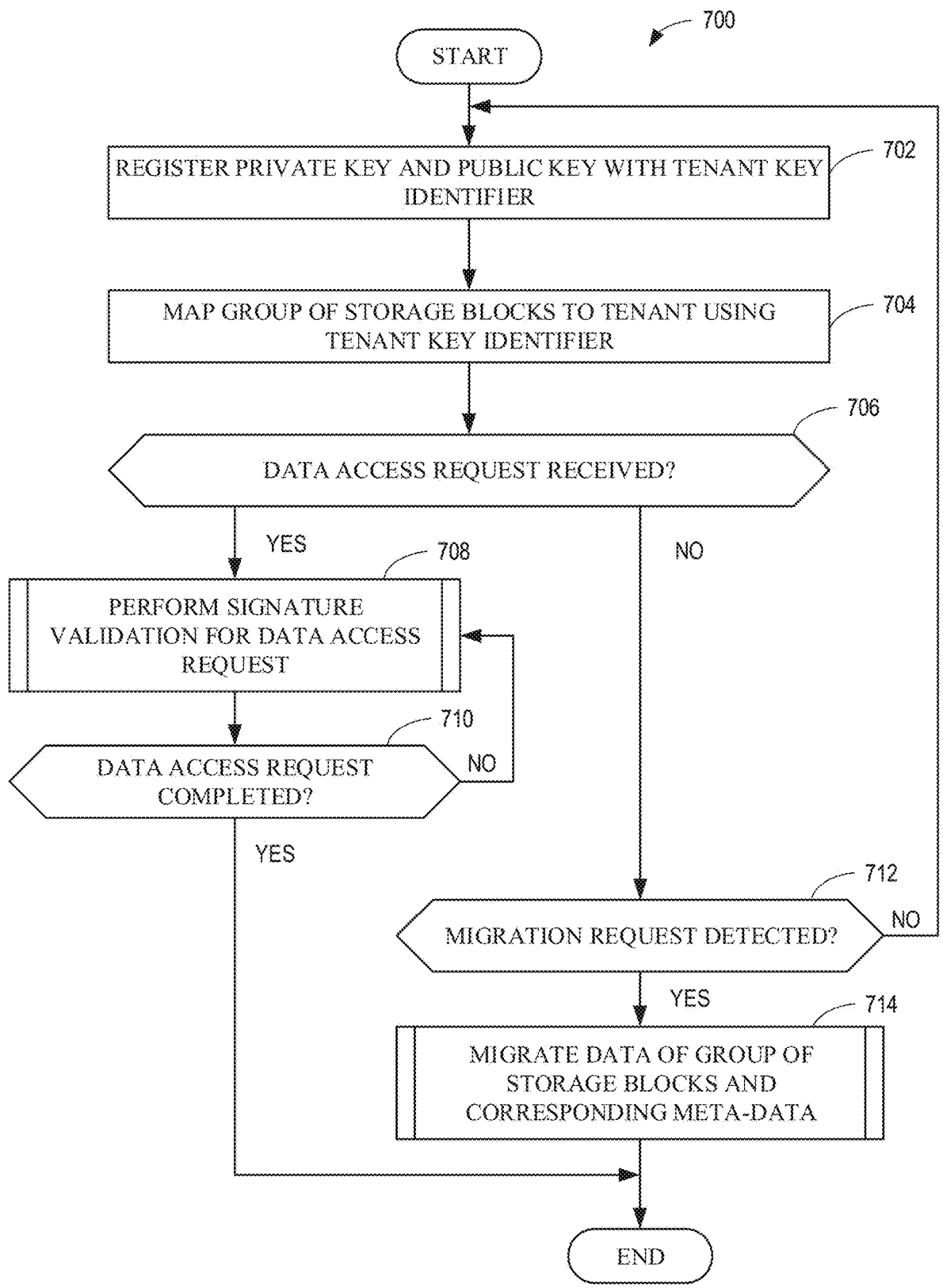
FIG. 7 is a flowchart representative of machine readable instructions which may be executed by a processor to implement the example storage controller of FIG. 6.

FIG. 7 is a flowchart representative of machine readable instructions 700 which may be executed by a processor to implement the example storage controller 602 of FIG. 6. The example instructions 700 of FIG. 7 begin at block 702 at which the example key manager 606 (FIG. 6) registers a private key and a public key with a tenant key identifier. In some examples, the key manager 606 receives a tenant key identifier from the tenant interface 604 and registers a public key and private key to be associated with the tenant key identifier. In some examples, the key manager 606 receives a tenant key identifier and storage block addresses from the tenant interface 604 to associate the registered private key and the registered public key, the tenant key identifier, and the storage block addresses. In some examples, the key manager 606 works with the block manager 608 (FIG. 6) to associate the registered private key, the registered public key, and the tenant key identifier with the storage block addresses from the tenant interface 604. In some examples, one tenant may have multiple applications, and each application includes an application key identifier. In some examples, the key manager 606 receives an application key identifier and storage block addresses from the tenant interface 604 to associate the registered private key and the registered public key, the application key identifier, and storage block addresses.

At block 704, the example block manager 608 maps a group of storage blocks to a tenant using the tenant key identifier. The example block manager 608 identifies groups of storage blocks by generating a block group identifier that is associated with the storage block addresses for the tenant. In the illustrated example, each storage block included in the group of storage blocks may include a different data file, and the block manager 608 groups the data files of the storage blocks into the group of storage blocks. The example block manager 608 associates the block group identifier and storage block addresses with the tenant key identifier and current signature provided by the key manager 606. In some examples, the block manager 608 associates the block group identifier and storage block addresses with an application key identifier and current signature provided by the key manager 606.

At block 706, the example block manager 608 determines if a data access request is received. In some examples, the block manager 608 determines if a data access request is received from applications on the software stack using the example application interface 614 (FIG. 6). As used herein, a data access request can include a write request (e.g., a request to write data to a storage block) and/or a read request (e.g., a request to read data from a storage block). If the example block manager 608 determines a data access request is received, the instructions 700 continue to block 708 at which the block manager 608 performs signature validation for the data access request. If at block 706 the example block manager 608 determines a data access request is not received, the instructions 700 continue to block 712 at which the migration handler 618 (FIG. 6) determines if a migration request is detected.

Figure 8:
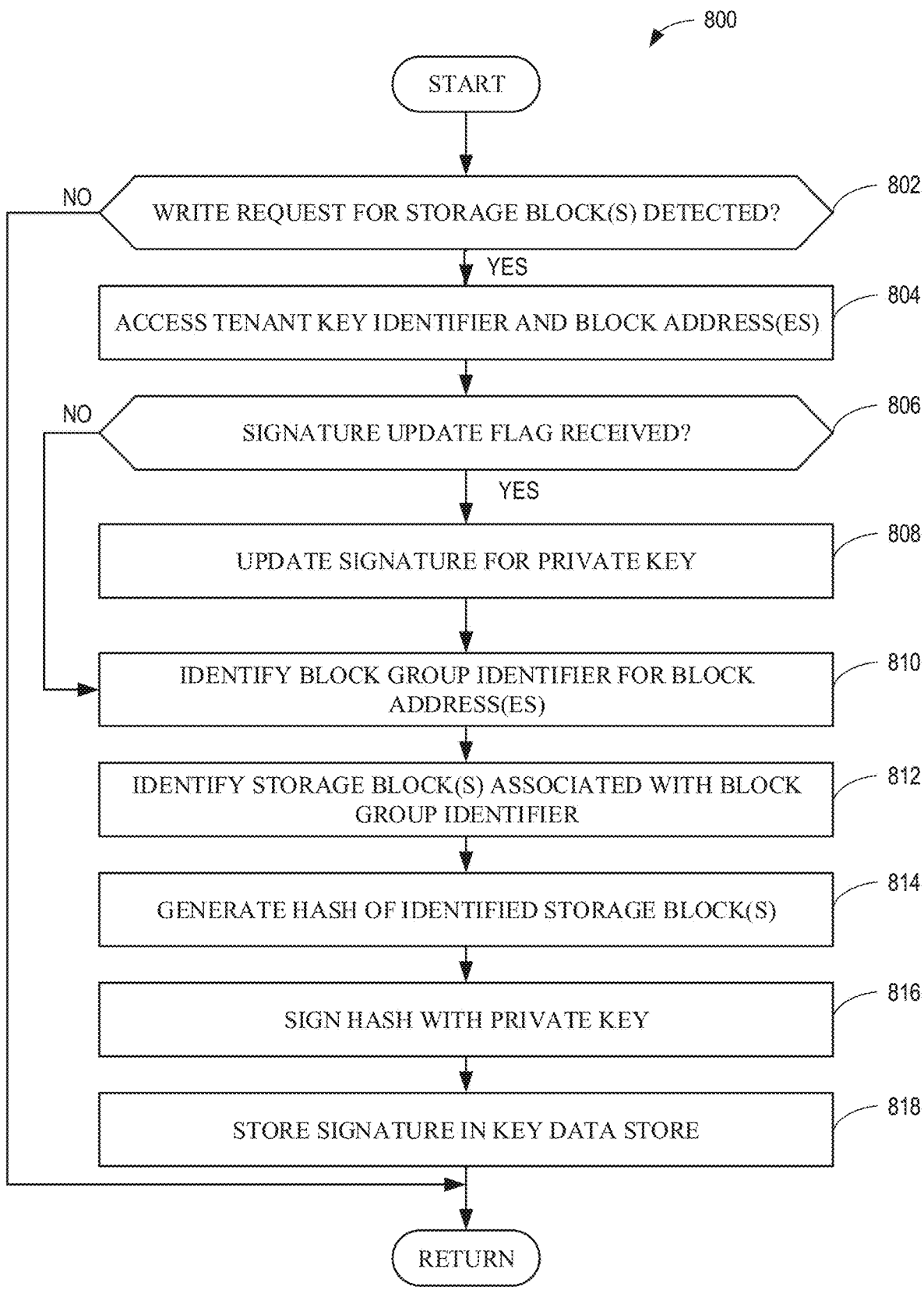
FIG. 8 is a flowchart representative of machine readable instructions which may be executed by a processor to implement the example storage controller of FIG. 6 to process write requests.
Figure 9:
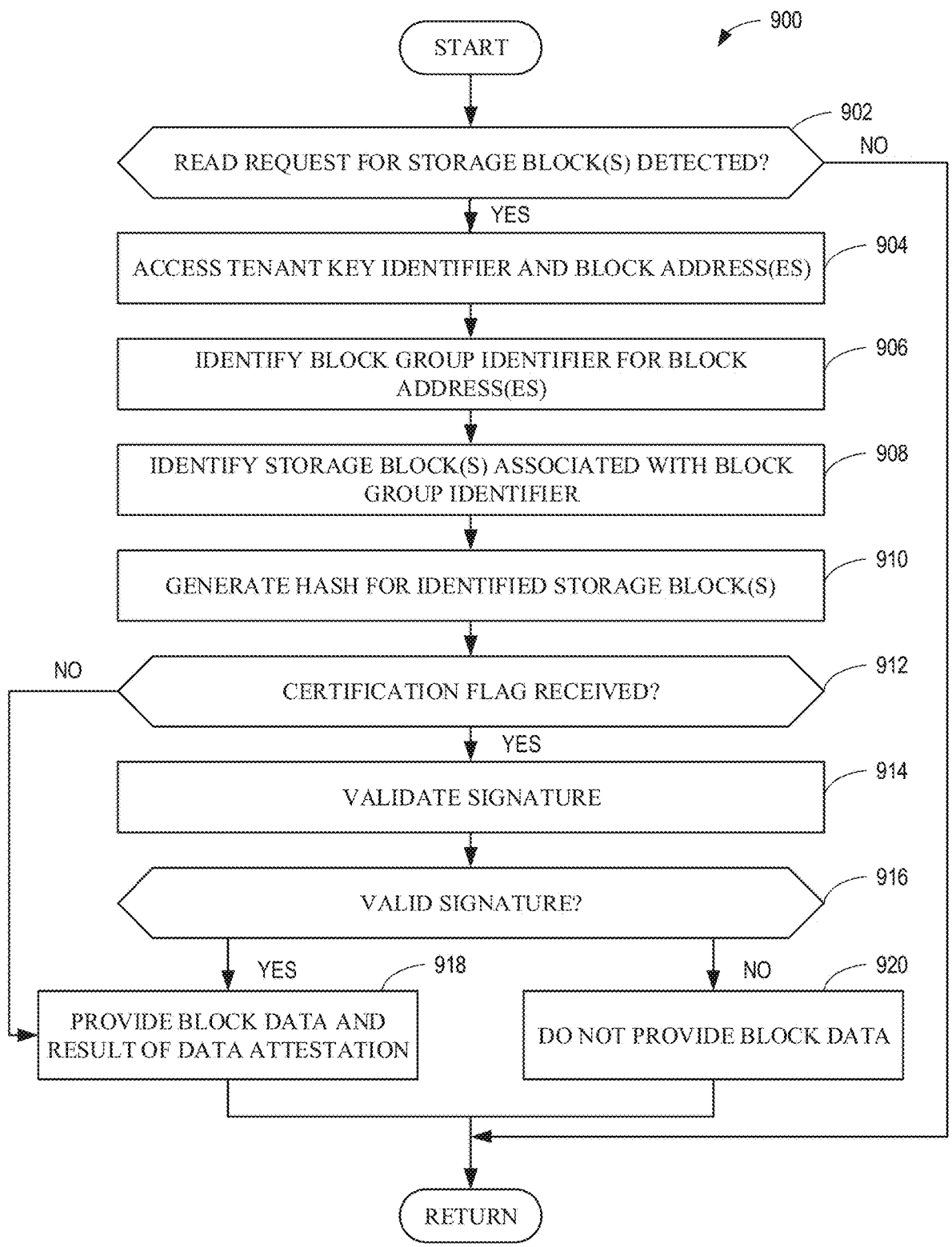
FIG. 9 is a flowchart representative of machine readable instructions which may be executed by a processor to implement the example storage controller of FIG. 6 to process read requests.

At block 708, the example block manager 608 performs signature validation for the data access request. The example block manager 608 performs signature validation for the data access requests based on the map of groups of storage blocks to tenants using tenant key identifiers and/or application key identifiers along with storage block addresses. In some examples, the block manager 608 receives the data access request and determines if the data access request is a write request or a read request. In some examples, the data access request includes a function call that identifies a write request or a read request (e.g., write( ) or read( )). An example flowchart of FIG. 8 represents example instructions 800 that may be executed to implement block 708 of FIG. 7 to perform signature validation for a write request. An example flowchart of FIG. 9 represents example instructions 900 that may be executed to implement block 708 to perform signature validation for a read request. In the illustrated example, the instructions 700 select the instructions 800 of FIG. 8 for a write request and/or select instructions 900 of FIG. 9 for a read request. At block 710, the example block manager 608 determines if the data access request is completed. For example, after the completion of the example instructions 800 of FIG. 8 or the example instructions 900 of FIG. 9, the block manager 608 determines if an action included in the signature validation for the data access request for a write request and/or a read request is completed (e.g., a block group identifier was identified, a hash was generated, etc.). If the example block manager 608 determines the data access request is completed, the instructions 700 end. If at block 710, the example block manager 608 determines the data access request is not completed, the instructions 700 return to block 708 at which the block manager 608 performs signature validation for the data access request.

Figure 10:
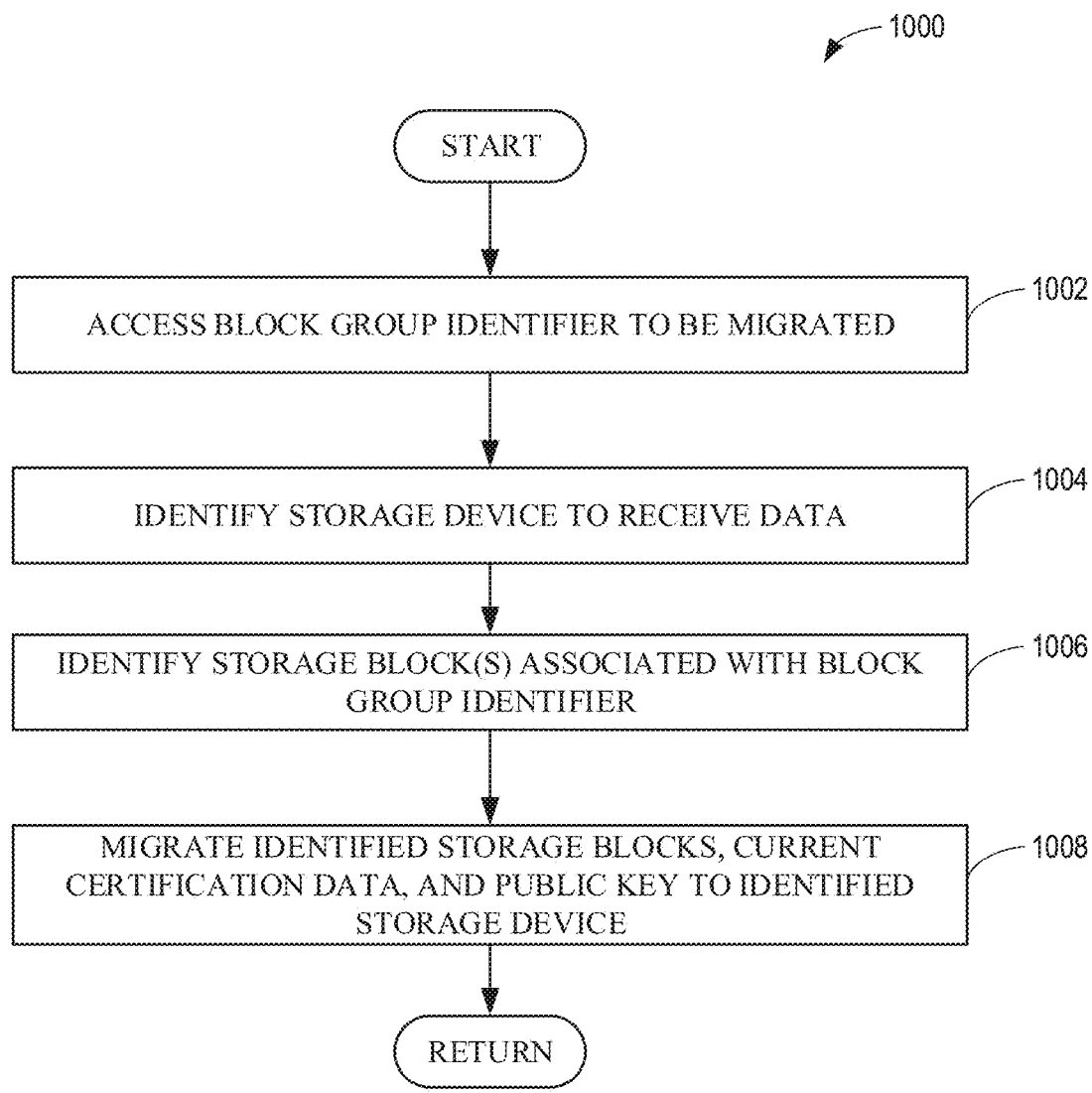
FIG. 10 is a flowchart representative of machine readable instructions which may be executed by a processor to implement the example storage controller of FIG. 6 to process migration requests.

At block 712, the example migration handler 618 (FIG. 6) determines if a migration request is received. In some examples, the migration handler 618 determines if a migration request is received from the application interface 614 (FIG. 6). If the example migration handler 618 determines a migration request is received, the instructions 700 continue to block 714 at which the migration handler 618 migrates data of a group of storage blocks example and corresponding meta-data. If at block 712 the example migration handler 618 determines a migration request is not received, the instructions 700 wait. At block 714, the example migration handler 618 migrates data of a group of storage blocks and corresponding meta-data. An example flowchart of FIG. 10 represents example instructions 1000 that may be executed to implement block 714 to migrate the data of a group of storage blocks and corresponding meta-data. After the example migration handler 618 migrates the data of the group of storage blocks and corresponding meta-data, the instructions 700 end.

FIG. 8 is a flowchart representative of machine readable instructions 800 which may be executed to implement the example storage controller 602 of FIG. 6 to process write requests. For example, the example instructions of FIG. 8 may be used to implement block 708 of FIG. 7 for write requests. The example instructions 800 begin at block 802 at which the block manager 608 (FIG. 6) determines if a write request for storage block(s) is detected. For example, a write request may be received from the application interface 614 (FIG. 6). If the example block manager 608 determines a write request for storage block(s) is not detected, the instructions 800 of FIG. 8 end and control returns to the instructions 700 of FIG. 7.

If at block 802 the example block manager 608 determines a write request for storage block(s) is detected, the instructions 800 continue to block 804 at which the block manager 608 accesses a tenant key identifier and block address(es). In some examples, the block manager 608 receives a tenant key identifier and block address(es) in the write request. In some examples, the block manager 608 receives an application key identifier and block address(es) in the write request. The example block manager 608 identifies the private key and the public key that are associated with the tenant key identifier and/or the application key identifier provided in the write request using the key manager 606.

At block 806, the example block manager 608 determines if a signature update flag is received. In some examples, the write request includes a flag or bit (e.g., a signature update flag) that identifies if the signature for the storage blocks identified by the write request needs to be updated. The example block manager 608 determines whether the write request includes the signature update flag to indicate the signature associated with the write request is to be updated. If the example block manager 608 determines the signature update flag is received, the instructions 800 continue to block 808 at which the block manager 608 updates the signature for the private key. If at block 806 the example block manager 608 determines the signature update flag is not received, the instructions 800 continue to block 810 at which the block manager 608 identifies the block group identifier for the block address(es).

At block 808, the example block manager 608 updates the signature for the private key. For example, the block manager 608 updates the private key associated with the tenant key identifier and/or the application key identifier included in the write request. At block 810, the block manager 608 identifies the block group identifier for the block address(es). For example, the block manager 608 identifies the block group identifier for the block address(es) provided in the write request using the map of block group identifiers to storage block addresses. At block 812, the example block manager 608 identifies the storage block(s) associated with the block group identifier. In some examples, the block group identifier is associated with a group of storage blocks that include storage blocks and the corresponding storage block addresses that were not included in the write request.

At block 814, the example block manager 608 generates a hash of identified storage block(s). For example, the block manager 608 generates a hash of the group of storage blocks identified as being associated with the block group identifier of the write request. At block 816, the example block manager 608 signs the hash with the private key. The example block manager 608 signs the hash with the private key (either the original private key associated with the tenant key identifier and/or the application key identifier provided in the write request using the key manager 606, or the updated private key). In some examples, the block manager 608 signs the hash using hardware circuitry. In such examples, the block manager 608 accesses a hardware device (e.g., an FPGA, an ASIC, etc.) using the example hardware interface 616 (FIG. 6) to sign the hash.

At block 818, the example key manager 606 stores the signature in the key data store 610 (FIG. 6). In some example, the block manager 608 provides an updated private key for the tenant key identifier and/or the application key identifier based on the write request. The example key manager 606 stores the signature used for the hash in the key data store 610. After the key manager 606 stores the signature in the key data store 610, the instructions 800 end, and control returns to the instructions 700 of FIG. 7.

FIG. 9 is a flowchart representative of machine readable instructions 900 which may be executed by a processor to implement the example storage controller 602 of FIG. 6 to process read requests. The example instructions 900 may be executed to implement block 708 of FIG. 7 for read requests. The example instructions 900 begin at block 902 at which the block manager 608 determines if a read request for storage block(s) is detected. For example, a read request may be received from the example application interface 614 (FIG. 6). If the example block manager 608 determines a read request for storage block(s) is not detected, the instructions 900 of FIG. 9 end and control returns to the instructions 700 of FIG. 7.

If at block 902 the example block manager 608 determines a read request for storage block(s) is detected, the instructions 900 continue to block 904 at which the block manager 608 accesses a tenant key identifier and block address(es). In some examples, the block manager 608 receives an application key identifier and block address(es) in the read request. At block 906, the example block manager 608 identifies the block group identifier for the block address(es). For example, the block manager 608 identifies the block group identifier for the block address(es) provided in the read request using the map of block group identifiers to storage block addresses. At block 908, the example block manager 608 identifies the storage block(s) associated with the block group identifier. In some examples, the block group identifier is associated with a group of storage blocks that include storage blocks and the corresponding storage block addresses that were not included in the read request. At block 910, the example block manager 608 generates a hash for the identified storage block(s).

At block 912, the block manager 608 determines if a certification flag is received. For example, the block manager 608 determines whether the read request includes the certification flag to indicate the read request is to be certified/validated before providing results data from the hash of the group of storage blocks. If the example block manager 608 determines the certification flag is received, the instructions 900 continue to block 914 at which the block manager 608 validates the signature. In some examples, the block manager 608 identifies the private key and the public key that are associated with the tenant key identifier and/or the application key identifier provided in the read request using the key manager 606 (FIG. 6). The example block manager 608 validates the signature from the read request with the signature from the private key associated with the tenant key identifier and/or the application key identifier provided in the read request using the key manager 606. In some examples, the block manager 608 validates the signature from the read request using hardware circuitry. In such examples, the block manager 608 accesses a hardware device (e.g., an FPGA, an ASIC, etc.) using the example hardware interface 616 to validate the signature. If at block 912 the block manager 608 determines the certification flag is not received, the instructions 900 continue to block 918.

At block 916, the example block manager 608 determines if the signature is valid. If the example block manager 608 determines the signature is valid, the instructions 900 continue to block 918. At block 918, the example block manager 608 provides the block data and result of data attestation. At block 918, the block manager 608 provides the data from the hash of the group of storage blocks along with the result of the data attestation to the requesting application of the software stack. After the example block manager 608 provides the block data and result of data attestation, the instructions 900 of FIG. 9 end, and control returns to the instructions 700 of FIG. 7. If at block 916 the example block manager 608 determines the signature is not valid, the instructions 900 continue to block 920 at which the block manager 608 does not provide the block data. After the example block manager 608 does not provide the block data, the instructions 900 of FIG. 9 end, and control returns to the instructions 700 of FIG. 7.

FIG. 10 is a flowchart representative of machine readable instructions 1000 which may be executed by a processor to implement the example storage controller 602 of FIG. 6 to process migration requests. The example instructions 1000 may be executed to implement block 714 of FIG. 7. The example instructions 1000 begins at block 1002 at which the migration handler 618 (FIG. 6) accesses the block group identifier to be migrated. At block 1004, the example migration handler 618 identifies the storage device to receive the data. For example, the migration handler 618 identifies the storage device to receive the data from the migration request. In some examples, the migration request includes an identifier of the storage device to receive the data. Alternatively, the example migration handler 618 may identify the storage device that the migration request came from as the storage device to receive the data.

At block 1006, the example migration handler 618 identifies the storage block(s) associated with the block group identifier. At block 1008, the example migration handler 618 migrates the identified storage blocks, the current certification data, and the public key to the identified storage device. In some examples, the migration handler 618 migrates the data of the group of storage blocks associated with the block group identifier, the certification information of the data of the group of storage blocks, and the public key corresponding to the group of storage blocks from a first storage device (e.g., the example first storage device 620) to a second storage device (e.g., the example second storage device 622). In the illustrated example, the private key associated with the group of storage blocks is not migrated to the requesting storage device (e.g., the second storage device 622). However, in additional or alternative examples, the private key can be migrated by the migration handler 618 in response to a migration request. In some examples, the migration handler 618 accesses hardware circuitry to migrate the data of the group of storage blocks associated with the block group identifier, the certification information of the data of the group of storage blocks, and the public key corresponding to the group of storage blocks. In such examples, the migration handler 618 access a hardware device (e.g., an FPGA, an ASIC, etc.) using the hardware interface 616 (FIG. 6) to increase the speed of the migration of data. After the migration handler 618 migrates the identified storage blocks, the current certification data, and the public key to the identified storage device, the instructions 1000 of FIG. 10 end, and control returns to the instructions 700 of FIG. 7.

Figure 11:
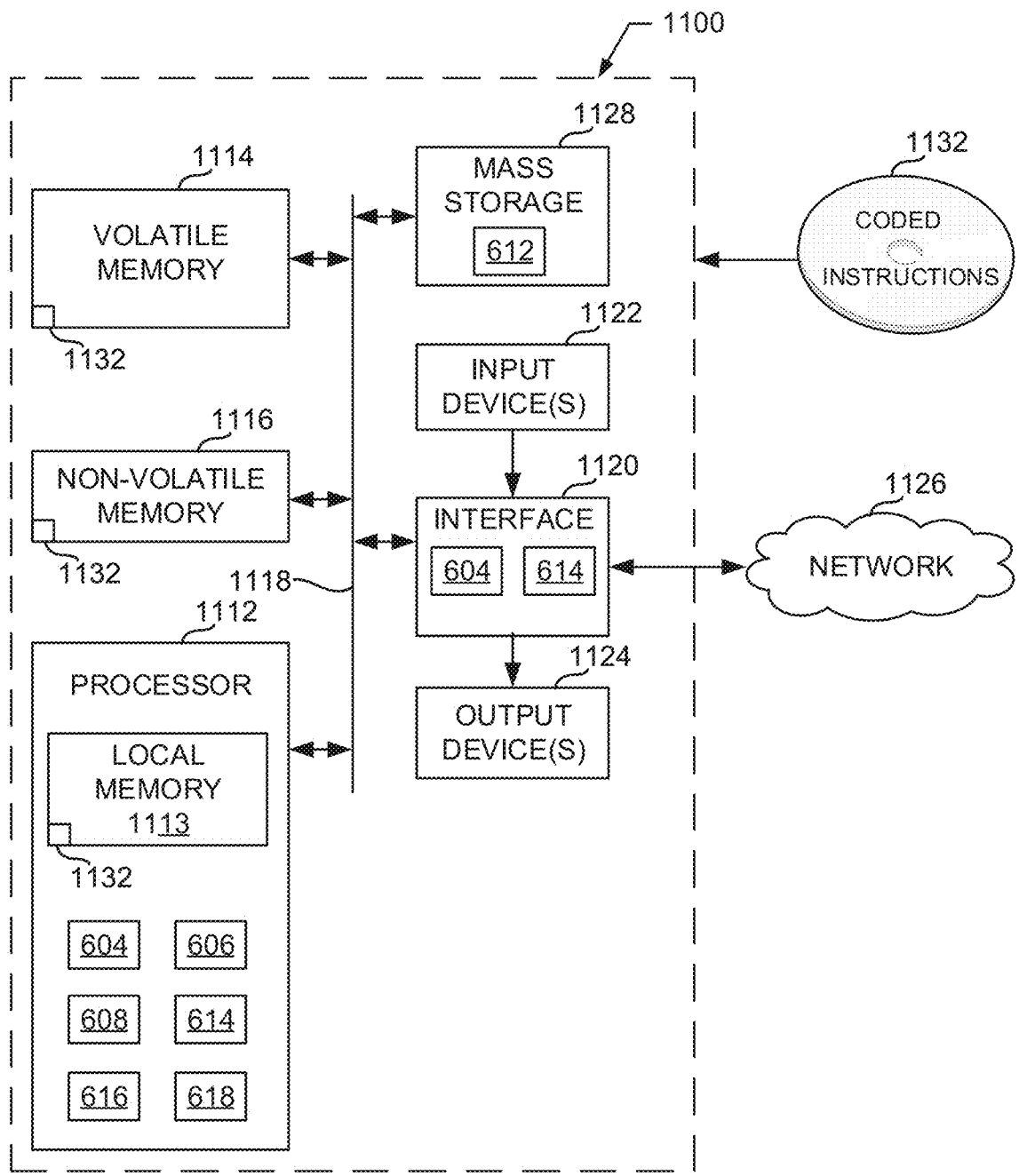
FIG. 11 is a block diagram of an example processing platform structured to execute the instructions of FIGS. 7-10 to implement the example storage controller of FIG. 6.

FIG. 11 is a block diagram of an example processor platform 1100 structured to execute the instructions of FIGS. 7-10 to implement the storage controller 602 of FIG. 6. The processor platform 1100 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example tenant interface 604, the example key manager 606, the example block manager 608, the example application interface 614, the example hardware interface 616, and the example migration handler 618.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface. Additionally or alternatively, in some example the interface circuit 1120 may implement the example tenant interface 604 and the example application interface 614.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives. Additionally or alternatively, in some example the mass storage devices 1128 may implement the example key data store 610 and the example block data store 612.

Machine executable instructions 1132 represented in FIGS. 7-10 may be stored in the mass storage device 1128, in the volatile memory 1114, in the non-volatile memory 1116, and/or on a removable non-transitory computer readable storage medium such as a CD or DVD.

Figure 12:
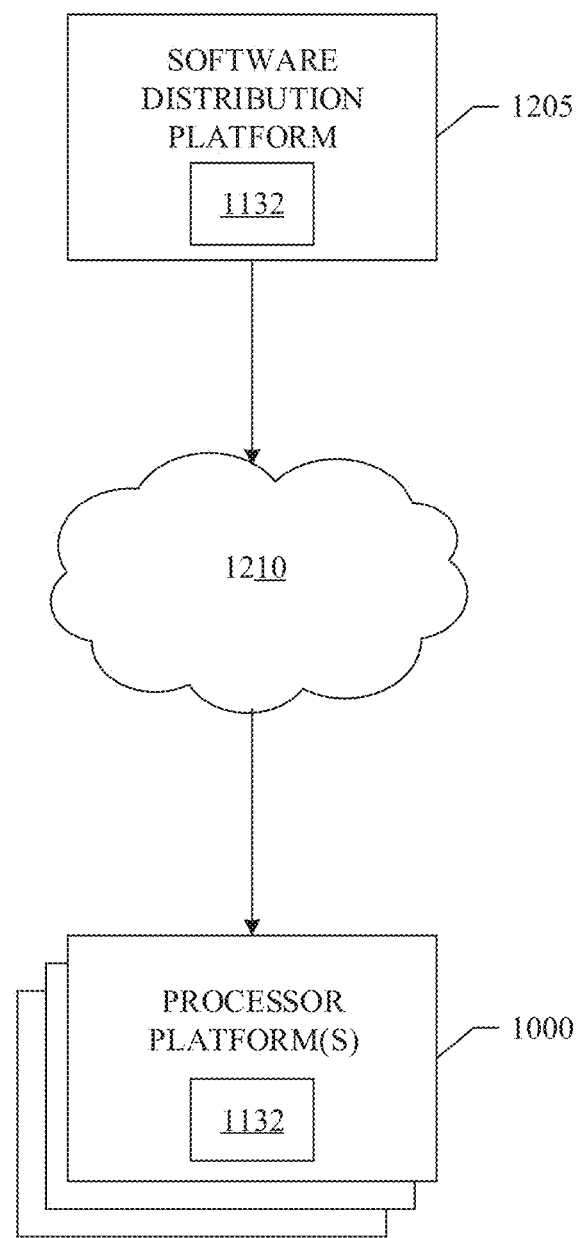
FIG. 12 is a block diagram of an example software distribution platform to distribute software (e.g., software corresponding to the example computer readable instructions of FIGS. 7-10) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1205 to distribute software such as the example computer readable instructions 1132 of FIG. 11 to third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1132 of FIG. 11. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the computer readable instructions 1132, which may correspond to the example computer readable instructions 1132 of FIG. 11, as described above. The one or more servers of the example software distribution platform 1205 are in communication with a network 1210, which may correspond to any one or more of the Internet and/or any of the example networks 1126 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1132 from the software distribution platform 1205. For example, the software, which may correspond to the example computer readable instructions 1132 of FIG. 11, may be downloaded to the example processor platform 1000, which is to execute the computer readable instructions 1132 to implement the storage controller 602 of FIG. 6. In some examples, one or more servers of the software distribution platform 1205 periodically offer, transmit, and/or force updates to the software (e.g., the example computer readable instructions 1132 of FIG. 11) to ensure improvements, patches, updates, etc. are distributed and applied to the software at the end user devices.

From the foregoing, it will be appreciated that example methods, apparatus and articles of manufacture have been disclosed that certify multi-tenant storage blocks or groups of blocks. The disclosed methods, apparatus and articles of manufacture provide data validation across different tenants and different edge locations. In particular, the disclosed methods, apparatus and articles of manufacture provide multi-block data certification for groups of storage blocks (e.g., groups of files) associated with a same tenants/service using a hardware mechanism, such as FPGAs or ASICs. Additionally, the hardware mechanism is configured to manage the data certification at the storage block granularity level while minimizing the latency in the edge cloud architecture, unlike if the software stack were to manage the data certification at such a fine granularity.

Example methods, apparatus, systems, and articles of manufacture to certify multi-tenant storage blocks or groups of blocks are disclosed herein. Further examples and combinations thereof include the following:

Example 1 includes an apparatus comprising a block manager to generate a map by mapping a group of storage blocks to a tenant using at least one of a tenant key identifier or an application key identifier, the group of storage blocks associated with a signature, the signature to validate the group of storage blocks, access a data access request for a first storage block, the data access request from a software stack, and perform a signature validation for the data access request based on the map of the group of storage blocks to the tenant, and a migration handler to migrate data of the group of storage blocks and corresponding meta-data from a first storage device to a second storage device, the metadata including attestation data of the group of storage blocks.

Example 2 includes the apparatus as defined in example 1, further including a key manager to register a private key and a public key associated with the at least one of the tenant key identifier for the tenant or the application key identifier for a first application of the tenant, and validate data in addresses of the group of storage blocks using the private key and the public key.

Example 3 includes the apparatus as defined in any one or more of examples 1-2, further including a tenant interface to provide the at least one of the tenant key identifier or the application key identifier and the addresses of the group of storage blocks to the key manager, the key manager to associate the addresses of the group of storage blocks to the at least one of the tenant key identifier or the application key identifier using the block manager.

Example 4 includes the apparatus as defined in any one or more of examples 1-3, wherein the data access request is a write request, and in response to the write request, the block manager is to identify the private key and the public key associated with the at least one of the tenant key identifier or the application key identifier, the at least one of the tenant key identifier or the application key identifier provided in the write request, determine whether a second application on the software stack provided a flag to indicate a first signature associated with the write request is to be updated, in response to determining the second application on the software stack provided the flag, update the private key and provide the private key to the key manager, identify the group of storage blocks associated with a storage block address of the first storage block, the storage block address included in the write request, generate a hash of the group of storage blocks, and sign the hash with the private key.

Example 5 includes the apparatus as defined in any one or more of examples 1-4, wherein the data access request is a read request, and in response to the read request, the block manager is to identify the group of storage blocks associated with a storage block address of the first storage block, the storage block address included in the read request, generate a hash of the group of storage blocks, determine whether a second application on the software stack provided a flag to indicate a first signature associated with the read request is to be validated, in response to determining the second application on the software stack provided the flag, validate the signature based on the private key and the public key associated with the at least one of the tenant key identifier or the application key identifier, the at least one of the tenant key identifier or the application key identifier provided by the key manager, and in response to the signature being valid, provide data from the hash of the group of storage blocks to the application on the software stack.

Example 6 includes the apparatus as defined in any one or more of examples 1-5, further including an application interface to receive the data access request from an application, the data access request to cause the block manager to perform signature validation for the group of storage blocks associated with the first storage block indicated in the data access request, the group of storage blocks included in the first storage device.

Example 7 includes the apparatus as defined in any one or more of examples 1-6, wherein the migration handler is to migrate the data of the group of storage blocks, a certification of the data of the group of storage blocks, and a public key corresponding to the group of storage blocks to the second storage device.

Example 8 includes the apparatus as defined in any one or more of examples 1-7, wherein the block manager is to validate a signature of the data access request using hardware circuitry, the hardware circuitry is at least one of a field-programmable gate array (FPGA) or an application-specific integrated circuit (ASIC).

Example 9 includes the apparatus as defined in any one or more of examples 1-8, wherein the migration handler is to migrate the data of the group of storage blocks and the corresponding meta-data from the first storage device to the second storage device using hardware circuitry, the hardware circuitry is at least one of a field-programmable gate array (FPGA) or an application-specific integrated circuit (ASIC).

Example 10 includes the apparatus as defined in any one or more of examples 1-9, wherein the group of storage blocks includes a plurality of files, and the block manager is to validate the plurality of files using the signature.

Example 11 includes the apparatus as defined in any one or more of examples 1-10, wherein the first storage device and the second storage device are edge devices, the migration handler to migrate the data of the group of storage blocks and the corresponding meta-data between the first storage device and the second storage device at corresponding edge locations of an edge computing network using a storage application programming interface (API).

Example 12 is an edge computing gateway that includes the apparatus of any one or more of examples 1-11.

Example 13 is an edge node that includes the apparatus of any one or more of examples 1-11.

Example 14 includes a non-transitory computer readable storage medium comprising instructions that, when executed, cause at least one processor to generate a map by mapping a group of storage blocks to a tenant using at least one of a tenant key identifier or an application key identifier, the group of storage blocks associated with a signature, the signature to validate the group of storage blocks, access a data access request for a first storage block, the data access request from a software stack, perform a signature validation for the data access request based on the map of the group of storage blocks to the tenant, and migrate data of the group of storage blocks and corresponding meta-data from a first storage device to a second storage device, the meta-data including attestation data of the group of storage blocks.

Example 15 includes the non-transitory computer readable storage medium as defined in example 14, wherein the instructions, when executed, cause the at least one processor to register a private key and a public key associated with the at least one of the tenant key identifier for the tenant or the application key identifier for a first application of the tenant, and validate data in addresses of the group of storage blocks using the private key and the public key.

Example 16 includes the non-transitory computer readable storage medium as defined in any one or more of examples 14-15, wherein the instructions, when executed, cause the at least one processor to associate addresses of the group of storage blocks to the at least one of the tenant key identifier or the application key identifier.

Example 17 includes the non-transitory computer readable storage medium as defined in any one or more of examples 14-16, wherein the data access request is a write request, and the instructions, when executed, cause the at least one processor to, in response to the write request identify the private key and the public key associated with the at least one of the tenant key identifier or the application key identifier, the at least one of the tenant key identifier or the application key identifier provided in the write request, determine whether a second application on the software stack provided a flag to indicate a first signature associated with the write request is to be updated, in response to determining the second application on the software stack provided the flag, update the private key, identify the group of storage blocks associated with a storage block address of the first storage block, the storage block address included in the write request, generate a hash of the group of storage blocks, and sign the hash with the private key.

Example 18 includes the non-transitory computer readable storage medium as defined in any one or more of examples 14-17, wherein the data access request is a read request, and the instructions, when executed, cause the at least one processor to, in response to the read request identify the group of storage blocks associated with a storage block address of the first storage block, the storage block address included in the read request, generate a hash of the group of storage blocks, determine whether a second application on the software stack provided a flag to indicate a first signature associated with the read request is to be validated, in response to determining the second application on the software stack provided the flag, validate the signature based on the private key and the public key associated with the at least one of the tenant key identifier or the application key identifier, and in response to the signature being valid, provide data from the hash of the group of storage blocks to the application on the software stack.

Example 19 includes the non-transitory computer readable storage medium as defined in any one or more of examples 14-18, wherein the instructions, when executed, cause the at least one processor to receive the data access request from an application, the data access request to cause the at least one processor to perform signature validation for the group of storage blocks associated with the first storage block indicated in the data access request, the group of storage blocks included in the first storage device.

Example 20 includes the non-transitory computer readable storage medium as defined in any one or more of examples 14-19, wherein the instructions, when executed, cause the at least one processor to migrate the data of the group of storage blocks, a certification of the data of the group of storage blocks, and a public key corresponding to the group of storage blocks to the second storage device.

Example 21 includes the non-transitory computer readable storage medium as defined in any one or more of examples 14-20, wherein the instructions, when executed, cause the at least one processor to validate a signature of the data access request using hardware circuitry, the hardware circuitry is at least one of a field-programmable gate array (FPGA) or an application-specific integrated circuit (ASIC).

Example 22 includes the non-transitory computer readable storage medium as defined in any one or more of examples 14-21, wherein the instructions, when executed, cause the at least one processor to migrate the data of the group of storage blocks and the corresponding meta-data from the first storage device to the second storage device using hardware circuitry, the hardware circuitry is at least one of a field-programmable gate array (FPGA) or an application-specific integrated circuit (ASIC).

Example 23 includes the non-transitory computer readable storage medium as defined in any one or more of examples 14-22, wherein the group of storage blocks includes a plurality of files, and the instructions, when executed, cause the at least one processor to validate the plurality of files using the signature.

Example 24 includes the non-transitory computer readable storage medium as defined in any one or more of examples 14-23, wherein the first storage device and the second storage device are edge devices, the instructions, when executed, cause the at least on processor to migrate the data of the group of storage blocks and the corresponding meta-data between the first storage device and the second storage device at corresponding edge locations of an edge computing network using a storage application programming interface (API).

Example 25 includes a method comprising generating a map by mapping a group of storage blocks to a tenant using at least one of a tenant key identifier or an application key identifier, the group of storage blocks associated with a signature, the signature to validate the group of storage blocks, accessing a data access request for a first storage block, the data access request from a software stack, performing a signature validation for the data access request based on the map of the group of storage blocks to the tenant, and migrating data of the group of storage blocks and corresponding meta-data from a first storage device to a second storage device, the meta-data including attestation data of the group of storage blocks.

Example 26 includes the method as defined in example 25, further including registering a private key and a public key associated with the at least one of the tenant key identifier for the tenant or the application key identifier for a first application of the tenant, and validating data in addresses of the group of storage blocks using the private key and the public key.

Example 27 includes the method as defined in any one or more of examples 25-26, further including associating addresses of the group of storage blocks to the at least one of the tenant key identifier or the application key identifier.

Example 28 includes the method as defined in any one or more of examples 25-27, wherein the data access request is a write request, and further including in response to the write request identifying the private key and the public key associated with the at least one of the tenant key identifier or the application key identifier, the at least one of the tenant key identifier or the application key identifier provided in the write request, determining whether a second application on the software stack provided a flag to indicate a first signature associated with the write request is to be updated, in response to determining the second application on the software stack provided the flag, updating the private key, identifying the group of storage blocks associated with a storage block address of the first storage block, the storage block address included in the write request, generating a hash of the group of storage blocks, and signing the hash with the private key.

Example 29 includes the method as defined in any one or more of examples 25-28, wherein the data access request is a read request, and further including in response to the read request identifying the group of storage blocks associated with a storage block address of the first storage block, the storage block address included in the read request, generating a hash of the group of storage blocks, determining whether a second application on the software stack provided a flag to indicate a first signature associated with the read request is to be validated, in response to determining the second application on the software stack provided the flag, validating the signature based on the private key and the public key associated with the at least one of the tenant key identifier or the application key identifier, and in response to the signature being valid, providing data from the hash of the group of storage blocks to the application on the software stack.

Example 30 includes the method as defined in any one or more of examples 25-29, further including receiving the data access request from an application, and in response to receiving the data access request, performing signature validation for the group of storage blocks associated with the first storage block indicated in the data access request, the group of storage blocks included in the first storage device.

Example 31 includes the method as defined in any one or more of examples 25-30, further including migrating the data of the group of storage blocks, a certification of the data of the group of storage blocks, and a public key corresponding to the group of storage blocks to the second storage device.

Example 32 includes the method as defined in any one or more of examples 25-31, further including validating a signature of the data access request using hardware circuitry, the hardware circuitry is at least one of a field-programmable gate array (FPGA) or an application-specific integrated circuit (ASIC).

Example 33 includes the method as defined in any one or more of examples 25-32, further including migrating the data of the group of storage blocks and the corresponding meta-data from the first storage device to the second storage device using hardware circuitry, the hardware circuitry is at least one of a field-programmable gate array (FPGA) or an application-specific integrated circuit (ASIC).

Example 34 includes the method as defined in any one or more of examples 25-33, wherein the group of storage blocks includes a plurality of files, and further including validating the plurality of files using the signature.

Example 35 includes the method as defined in any one or more of examples 25-34, wherein the first storage device and the second storage device are edge devices, and further including migrating the data of the group of storage blocks and the corresponding meta-data between the first storage device and the second storage device at corresponding edge locations of an edge computing network using a storage application programming interface (API).

Example 36 includes an apparatus comprising means for performing signature validation to generate a map by mapping a group of storage blocks to a tenant using at least one of a tenant key identifier or an application key identifier, the group of storage blocks associated with a signature, the signature to validate the group of storage blocks, access a data access request for a first storage block, the data access request from a software stack, and perform a signature validation for the data access request based on the map of the group of storage blocks to the tenant, and means for migrating data to migrate data of the group of storage blocks and corresponding meta-data from a first storage device to a second storage device, the meta-data including attestation data of the group of storage blocks.

Example 37 includes the apparatus as defined in example 36, further including means for registering private keys and public keys to register a private key and a public key associated with the at least one of the tenant key identifier for the tenant or the application key identifier for a first application of the tenant, and validate data in addresses of the group of storage blocks using the private key and the public key.

Example 38 includes the apparatus as defined in any one or more of examples 36-37, further including means for providing an identifier to provide the at least one of the tenant key identifier or the application key identifier and the addresses of the group of storage blocks to the key manager, the means for providing the identifier to associate the addresses of the group of storage blocks to the at least one of the tenant key identifier or the application key identifier using the block manager.

Example 39 includes the apparatus as defined in any one or more of examples 36-38, further including means for receiving a data access request to receive the data access request from an application, the data access request to cause the means for performing signature validation to perform signature validation for the group of storage blocks associated with the first storage block indicated in the data access request, the group of storage blocks included in the first storage device.

Example 40 is a system to implement any of Examples 1-39.

Example 41 is a multi-tier edge computing system, including a plurality of edge computing nodes provided among on-premise edge, network access edge, or near edge computing settings, the plurality of edge computing nodes configured to perform any of Examples 1-39.

Example 42 is an edge computing node, operable as a server hosting the service and a plurality of additional services in an edge computing system, configured to perform any of Examples 1-39.

Example 43 is an edge computing network, including networking and processing components configured to provide or operate a communications network, to enable an edge computing system to implement any of Examples 1-39.

Example 44 is a 5G network mobile wireless communications system, including networking and processing components configured as an edge computing system to implement any of Examples 1-39.

Example 45 is acceleration hardware with acceleration functions implemented thereupon, operable in an edge computing system, the acceleration functions configured to implement any of Examples 1-39.

Example 46 is storage hardware with storage capabilities implemented thereupon, operable in an edge computing system, the storage hardware configured to implement any of Examples 1-39.

Example 47 is an apparatus of an edge computing system including logic, modules, or circuitry to perform any of Examples 1-39.

Example 48 is an edge computing system including aspects of network functions, acceleration functions, acceleration hardware, storage hardware, or computation hardware resources, operable to invoke or perform the use cases discussed herein, with use of any of Examples 1-39, or other subject matter described herein.

Example 49 is an edge computing system adapted for mobile wireless communications, including configurations according to a 3GPP 4G/LTE or 5G network capabilities, operable to invoke or perform the use cases discussed herein, with use of any of Examples 1-39, or other subject matter described herein.

Example 50 is networking hardware, acceleration hardware, storage hardware, or computation hardware, with capabilities implemented thereupon, operable in an edge computing system to invoke or perform the use cases discussed herein, with use of any of Examples 1-39, or other subject matter described herein.

Example 51 is an apparatus of an edge computing system including: one or more processors and one or more computer-readable media including instructions that, when deployed and executed by the one or more processors, cause the one or more processors to invoke or perform the use cases discussed herein, with use of any of Examples 1-39, or other subject matter described herein.

Example 52 is an apparatus of an edge computing system including means, logic, modules, or circuitry to invoke or perform the use cases discussed herein, with the use of any of Examples 1-39, or other subject matter described herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   an interface to receive a data access request for a first storage block;
   machine-readable instructions;
   at least one processor circuit to be programmed by the machine-readable instructions to:
      generate a map by mapping a group of storage blocks to a tenant using a key identifier, the group of storage blocks associated with the first storage block indicated in the data access request and included in a first storage device, the group of storage blocks associated with a signature, the signature to validate the group of storage blocks;
      based on the data access request, perform a signature validation for the data access request based on the map of the group of storage blocks to the tenant, the signature validation corresponding to the group of storage blocks; and
      migrate data of the group of storage blocks and corresponding meta-data from the first storage device to a second storage device, the meta-data including attestation data of the group of storage blocks.

2. The apparatus as defined in claim 1, wherein one or more of the at least one processor circuit is to:
   register a private key and a public key associated with the key identifier for a first application of the tenant; and
   validate data in addresses of the group of storage blocks using the private key and the public key.

3. The apparatus as defined in claim 2, wherein one or more of the at least one processor circuit is to associate the addresses of the group of storage blocks to the key identifier.

4. The apparatus as defined in claim 2, wherein the data access request is a write request, and in response to the write request, one or more of the at least one processor circuit is to:
   identify the private key and the public key associated with the key identifier, the key identifier provided in the write request;
   determine whether a second application provided a flag to indicate a first signature associated with the write request is to be updated;
   in response to determining the second application provided the flag, update the private key;
   identify the group of storage blocks associated with a storage block address of the first storage block, the storage block address included in the write request;
   generate a hash of the group of storage blocks; and
   sign the hash with the private key.

5. The apparatus as defined in claim 2, wherein the data access request is a read request, and in response to the read request, one or more of the at least one processor circuit is to:
   identify the group of storage blocks associated with a storage block address of the first storage block, the storage block address included in the read request;
   generate a hash of the group of storage blocks;

determine whether a second application provided a flag to indicate a first signature associated with the read request is to be validated;

in response to determining the second application provided the flag, validate the signature based on the private key and the public key associated with the key identifier; and in response to the signature being validated, provide data from the hash of the group of storage blocks to the second application.

6. The apparatus as defined in claim 1, wherein one or more of the at least one processor circuit is to migrate the data of the group of storage blocks, a certification of the data of the group of storage blocks, and a public key corresponding to the group of storage blocks to the second storage device.

7. The apparatus as defined in claim 1, wherein the signature is a first signature, one or more of the at least one processor circuit to validate a second signature of the data access request using hardware circuitry, the hardware circuitry is at least one of a field-programmable gate array (FPGA) or an application-specific integrated circuit (ASIC).

8. The apparatus as defined in claim 1, wherein one or more of the at least one processor circuit is to migrate the data of the group of storage blocks and the corresponding meta-data from the first storage device to the second storage device using hardware circuitry, the hardware circuitry is at least one of a field-programmable gate array (FPGA) or an application-specific integrated circuit (ASIC).

9. The apparatus as defined in claim 1, wherein the group of storage blocks includes a plurality of files, and one or more of the at least one processor circuit is to validate the plurality of files using the signature.

10. The apparatus as defined in claim 1, wherein the first storage device and the second storage device are edge devices, one or more of the at least one processor circuit is to migrate the data of the group of storage blocks and the corresponding meta-data between the first storage device and the second storage device at corresponding edge locations of an edge computing network using a storage application programming interface (API).

11. A non-transitory computer readable storage medium comprising instructions to cause at least one processor circuit to at least:

generate a map by mapping a group of storage blocks to a tenant using a key identifier, the group of storage blocks associated with a signature, the signature to validate the group of storage blocks;

access a data access request the group of storage blocks associated with a first storage block indicated in the data access request and included in a first storage device;

perform a signature validation for the data access request based on the map of the group of storage blocks to the tenant, the signature validation corresponding to the group of storage blocks; and migrate data of the group of storage blocks and corresponding meta-data from the first storage device to a second storage device, the meta-data including attestation data of the group of storage blocks.

12. The non-transitory computer readable storage medium as defined in claim 11, wherein the instructions are to cause one or more of the at least one processor circuit to:

register a private key and a public key associated with the key identifier for a first application of the tenant; and validate data in addresses of the group of storage blocks using the private key and the public key.

13. The non-transitory computer readable storage medium as defined in claim 12, wherein the data access request is a write request, and the instructions to cause one or more of the at least one processor circuit to, in response to the write request:

identify the private key and the public key associated with the key identifier, the key identifier provided in the write request;

determine whether a second application provided a flag to indicate a first signature associated with the write request is to be updated;

in response to determining the second application provided the flag, update the private key;

identify the group of storage blocks associated with a storage block address of the first storage block, the storage block address included in the write request;

generate a hash of the group of storage blocks; and sign the hash with the private key.

14. The non-transitory computer readable storage medium as defined in claim 12, wherein the data access request is a read request, and the instructions are to cause one or more of the at least one processor circuit to, in response to the read request:

identify the group of storage blocks associated with a storage block address of the first storage block, the storage block address included in the read request;

generate a hash of the group of storage blocks;

determine whether a second application provided a flag to indicate a first signature associated with the read request is to be validated;

in response to determining the second application provided the flag, validate the signature based on the private key and the public key associated with the key identifier; and in response to the signature being validated, provide data from the hash of the group of storage blocks to the second application.

15. The non-transitory computer readable storage medium as defined in claim 12, wherein the instructions are to cause one or more of the at least one processor circuit to associate the addresses of the group of storage blocks to the key identifier.

16. The non-transitory computer readable storage medium as defined in claim 11, wherein the signature is a first signature, the instructions are to cause one or more of the at least one processor circuit to validate a second signature of the data access request using hardware circuitry, the hardware circuitry is at least one of a field-programmable gate array (FPGA) or an application-specific integrated circuit (ASIC).

17. The non-transitory computer readable storage medium as defined in claim 11, wherein the instructions are to cause one or more of the at least one processor circuit to migrate the data of the group of storage blocks and the corresponding meta-data from the first storage device to the second storage device using hardware circuitry, the hardware circuitry is at least one of a field-programmable gate array (FPGA) or an application-specific integrated circuit (ASIC).

18. The non-transitory computer readable storage medium as defined in claim 11, wherein the group of storage blocks includes a plurality of files, and the instructions to cause one or more of the at least one processor circuit to validate the plurality of files using the signature.

19. The non-transitory computer readable storage medium as defined in claim 11, wherein the first storage device and the second storage device are edge devices, the instructions are to cause one or more of the at least on processor circuit to migrate the data of the group of storage blocks and the corresponding meta-data between the first storage device and the second storage device at corresponding edge locations of an edge computing network using a storage application programming interface (API).

20. The non-transitory computer readable storage medium as defined in claim 11, wherein the instructions are to cause one or more of the at least one processor circuit to migrate the data of the group of storage blocks, a certification of the data of the group of storage blocks, and a public key corresponding to the group of storage blocks to the second storage device.

21. A method comprising:
generating a map by mapping a group of storage blocks to a tenant using a key identifier, the group of storage blocks associated with a signature, the signature to validate the group of storage blocks;
accessing a data access request, the group of storage blocks associated with a first storage block indicated in the data access request and included in a first storage device;
responsive to the data access request, performing, by at least one processor circuit programmed by at least one instruction, a signature validation for the data access request based on the map of the group of storage blocks to the tenant, the signature validation corresponding to the group of storage blocks; and
migrating data of the group of storage blocks and corresponding meta-data from the first storage device to a second storage device, the meta-data including attestation data of the group of storage blocks.

22. The method as defined in claim 21, further including:
registering a private key and a public key associated with the key identifier for a first application of the tenant; and
validating data in addresses of the group of storage blocks using the private key and the public key.

23. The method as defined in claim 22, wherein the data access request is a write request, and further including in response to the write request:
identifying the private key and the public key associated with the key identifier, the key identifier provided in the write request;
determining whether a second application provided a flag to indicate a first signature associated with the write request is to be updated;
in response to determining the second application provided the flag, updating the private key;
identifying the group of storage blocks associated with a storage block address of the first storage block, the storage block address included in the write request;
generating a hash of the group of storage blocks; and
signing the hash with the private key.

24. The method as defined in claim 22, wherein the data access request is a read request, and further including in response to the read request:
identifying the group of storage blocks associated with a storage block address of the first storage block, the storage block address included in the read request;
generating a hash of the group of storage blocks;
determining whether a second application provided a flag to indicate a first signature associated with the read request is to be validated;
in response to determining the second application provided the flag, validating the signature based on the private key and the public key associated with the key identifier; and
in response to the signature being validated, providing data from the hash of the group of storage blocks to the second application.

25. The method as defined in claim 21, wherein the signature is a first signature, the method further including validating a second signature of the data access request using hardware circuitry, the hardware circuitry is at least one of a field-programmable gate array (FPGA) or an application-specific integrated circuit (ASIC).

* * * * *